United States Patent
Komatsu et al.

(10) Patent No.: US 9,488,838 B2
(45) Date of Patent: Nov. 8, 2016

(54) VIRTUAL IMAGE DISPLAY APPARATUS

(71) Applicant: SEIKO EPSON CORPORATION, Tokyo (JP)

(72) Inventors: Akira Komatsu, Tatsuno-machi (JP); Takahiro Totani, Suwa (JP); Masayuki Takagi, Matsumoto (JP); Takashi Takeda, Suwa (JP); Toshiaki Miyao, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 10 days.

(21) Appl. No.: 14/470,367

(22) Filed: Aug. 27, 2014

(65) Prior Publication Data

US 2015/0062716 A1 Mar. 5, 2015

(30) Foreign Application Priority Data

Sep. 3, 2013 (JP) .................................. 2013-182160
Dec. 20, 2013 (JP) .................................. 2013-263475

(51) Int. Cl.
G02B 27/14 (2006.01)
G02B 27/01 (2006.01)
G02B 6/00 (2006.01)

(52) U.S. Cl.
CPC ............. *G02B 27/0172* (2013.01); *G02B 6/00* (2013.01); *G02B 2027/011* (2013.01); *G02B 2027/015* (2013.01); *G02B 2027/0152* (2013.01); *G02B 2027/0178* (2013.01)

(58) Field of Classification Search
CPC .......... G02B 27/0172; G02B 27/0101; G02B 2027/011
USPC .................... 359/630, 633, 861, 242, 485.05, 359/489.08; 349/11
See application file for complete search history.

(56) References Cited

U.S. PATENT DOCUMENTS

| | | | |
|---|---|---|---|
| 5,453,877 A | 9/1995 | Gerbe et al. | |
| 5,661,603 A | 8/1997 | Hanano et al. | |
| 8,662,686 B2* | 3/2014 | Takagi | G02B 27/0172 359/633 |
| 8,837,880 B2* | 9/2014 | Takeda | G02B 6/0006 385/15 |

(Continued)

FOREIGN PATENT DOCUMENTS

| | | |
|---|---|---|
| JP | A-8-129146 | 5/1996 |
| JP | B2-2746697 | 5/1998 |

(Continued)

OTHER PUBLICATIONS

STIC Search Results.*

*Primary Examiner* — Stephone B Allen
*Assistant Examiner* — Travis Fissel
(74) *Attorney, Agent, or Firm* — Oliff PLC

(57) ABSTRACT

An optical system of a virtual image display apparatus is configured such that, in regard to a width in a first direction and a width in a second direction at a first surface position, and a width in a first direction and a width in a second direction at a second surface position corresponding to the width in the first direction and the width in the second direction at the first surface position, predetermined conditional expressions are established. With this, in an optical system for an HMD which includes a light guide member having a free-form surface, it is possible to allow video light to be emitted toward eyes in an appropriate state while controlling the light guide of video light accurately and maintaining high performance.

12 Claims, 29 Drawing Sheets

(56) References Cited

U.S. PATENT DOCUMENTS

| | | | |
|---|---|---|---|
| 2004/0027475 A1* | 2/2004 | Kamo | G02B 13/22 348/335 |
| 2007/0153395 A1* | 7/2007 | Repetto | G02B 17/0856 359/630 |
| 2007/0258049 A1* | 11/2007 | Shaoulov | G03B 21/00 353/31 |
| 2012/0162549 A1* | 6/2012 | Gao | G02B 27/0172 349/11 |
| 2012/0280956 A1* | 11/2012 | Yamamoto | G02B 26/101 345/204 |

FOREIGN PATENT DOCUMENTS

| | | |
|---|---|---|
| JP | B2-3311122 | 8/2002 |
| JP | B2-3573474 | 10/2004 |

* cited by examiner

VIRTUAL IMAGE DISPLAY APPARATUS

CROSS-REFERENCE TO RELATED APPLICATIONS

The present application is a non-provisional application of Japanese Patent Application No. 2013-182160, filed on Sep. 3, 2013, and Japanese Patent Application No. 2013-263475, filed on Dec. 20, 2013, both of which are hereby incorporated by reference in their entireties.

BACKGROUND

1. Technical Field

Embodiments of the present invention relate to a virtual image display apparatus which provides video formed by an image display element or the like to an observer, and in particular, to a virtual image display apparatus which is suitable for a head-mounted display mounted to the head of the observer.

2. Related Art

Various optical systems have been proposed as an optical system which is assembled in a virtual image display apparatus, such as a head-mounted display (hereinafter, referred to as an HMD) mounted to the head of an observer (see Japanese Patent Nos. 2746697, 3311122, and 3573474, and JP-A-8-129146).

In regard to the virtual image display apparatus, such as an HMD, it is desirable to enlarge a viewing angle of video light and to reduce the weight of the apparatus. In particular, in order to improve the fit, it is important to reduce the thickness in a visual axis direction of the observer and to bring the center of gravity close to the observer.

If the field of view of the observer is completely covered and thus only video light is viewed, an external scene is not noticed by the observer, causing uneasiness for the observer. Furthermore, the external scene and video are displayed in an overlapping manner, various new usages, such as virtual reality, are produced. For this reason, there is a need for a display which displays video light in an overlapping manner without obstructing the field of view of the outside.

In order to improve the fit for the observer and to improve the appearance of the form, it is desirable to arrange a video display device across the face, instead of being disposed above the eyes.

In order to reduce the size of the optical system and to position the video display device according to the position of the eyes of the observer not to obstruct the field of view, it is preferable to image display image light on the optical system once to form an intermediate image, and a relay optical system which enlarges the intermediate image to be displayed.

For example, Japanese Patent No. 2746697 proposes a relay optical system which uses a parallel planar light guide plate, in which a parabolic mirror is provided at an end surface thereof, and a projection lens, and forms an intermediate image inside the light guide plate. However, in the case of the optical system of Japanese Patent No. 2746697, the projection lens is large in size, obstructing reduction in size and weight.

Japanese Patent No. 3311122 proposes an optical system which uses a relay lens optical system to reduce the size and weight of a projection lens. However, in this optical system, a large half mirror and a concave mirror are required in front of the eyes of the observer, and the appearance is significantly damaged. In order to observe an external scene, since a concave mirror should be a half mirror, and video light is reflected by the half mirror two times and is further transmitted through the half mirror, video becomes very dark.

In order to reduce the size of the optical system, it is effective to reduce the width of a light beam flux (light flux) passing through the optical system. If a sufficient light beam flux is not provided at the position of the pupil of the observer, the visual field of video is lacking, and some people cannot observe video depending on a difference in pupillary distance. Considering this point, in Japanese Patent No. 3573474, a relay optical system is configured, and a diffusion plate is placed at the position of the intermediate image to diffuse a light beam, the light beam flux width in the pupil is expanded. However, since an image on the diffusion plate is enlarged by an eyepiece lens system, a contaminant or a scratch on the diffusion plate is also enlarged, and there is a concern that video quality is damaged.

In JP-A-8-129146, a prism array is inserted between the eyepiece optical system and the eyes of the observer to spread the light beam flux. However, since the prism array requires a thickness, the distance between the eyepiece optical system and the eyes is extended, and the optical system increases in size.

SUMMARY

An advantage of some aspects of the invention is that it provides a small and lightweight virtual image display apparatus which has a wide viewing angle and high performance.

A virtual image display apparatus according to an aspect of the invention includes a video element which generates video light, and a light guide member which includes two or more non-axisymmetric curved surfaces and is a part of an optical system, an intermediate image being formed inside the light guide member, in which a first surface and a third surface among a plurality of surfaces constituting the light guide member are arranged to face each other, video light from the video element is totally reflected by the third surface, is totally reflected by the first surface, is reflected by the second surface, is transmitted through the first surface, and reaches an observation side, for the total light beam flux in the effective range which is emitted from the entire display screen of the video element and reaches the pupil arrangement position to be the position of the pupil of the observer and when, in a light beam flux cross-section of a region representing the range of the entire display screen of the video element, a surface position of the cross-section where a length in a first direction corresponding to a full width in a longitudinal direction becomes minimum is an A surface position (the first surface position), when, in a light beam flux cross-section of a region representing the range of the entire display screen of the video element, a surface position of the cross-section where a length in a second direction corresponding to a full width in a lateral direction is a B surface position (the second surface position), when, in the light beam flux cross-section at the A surface position, the width in the first direction is WAx and the width in the second direction is WAy, and when, in the light beam flux cross-section at the B surface position, the width in the first direction is WBx and the width in the second direction is WBy, the conditional expressions (1) and (2) are established.

$$WAx < WAy \quad (1)$$

$$WBy < WBx \quad (2)$$

Here, video light is light which is formed by the video element or the like and can be recognized as a virtual image to the eyes, and as described above, forms an intermediate image inside the light guide member. It may be assumed that the two or more non-axisymmetric curved surfaces in the light guide member are not intended to indicate specific surfaces, and for example, the first surface or the third surface may be a non-axisymmetric curved surface or may be a flat surface.

In the virtual image display apparatus described above, the intermediate image is formed inside the light guide member by the optical system or the like, and video light which is reflected in order of the third surface, the first surface, and the second surface is transmitted through the first surface and reaches the observer. For this reason, it is possible to realize bright and high-performance display with a wide viewing angle while reducing the thickness of the light guide member to reduce the size and weight of the entire optical system. In this case, although the second surface has power and the intermediate image is formed, since the second surface is inclined, large astigmatism is inevitably generated in video light. According to the aspect of the invention, the fourth surface, the fifth surface, and the like have a non-axisymmetric shape, whereby astigmatism is corrected as a whole. As a result, aberration occurs at a place conjugate to a location corresponding to an emission pupil, is divided into a conjugate point in the first direction and a conjugate point in the second direction, and Expressions (1) and (2) are established in terms of the width of the light beam flux at the A surface position and the B surface position. It is possible to realize a small and lightweight virtual image display apparatus which forms a high-performance image with a wide viewing angle by the curved surface shape from the first surface to the fifth surface appropriately set to correct aberration of video light.

In a specific aspect of the invention, an x axis and a y axis are taken in two orthogonal directions at one point on a curved surface of the light guide member, and when the curvature in the x-axis direction is Kx and the curvature in the y-axis direction is Ky, at least one curved surface has a point which satisfies the following conditional expression (3).

$$0.005 < |Kx - Ky| \quad (3)$$

In this case, if there is a curved surface which satisfies Expression (3), it is possible to correct aberration while realizing a small and lightweight virtual image display apparatus.

In another aspect of the invention, when a reference value which is a length to be the diameter of the pupil of the observer is H, in regard to the width WAx and the width WAy of the light beam flux cross-section at the A surface position and the width WBx and the width WBy of the light beam flux cross-section at the B surface position, the following conditional expressions (4) and (5) are established.

$$WAx < H < WAy \quad (4)$$

$$WBy < H < WBx \quad (5)$$

In this case, it is possible to improve optical performance without increasing the size of the light guide member or increasing the power of the lens constituting the optical system.

In still another aspect of the invention, when an expression of a surface shape is expanded as a polynomial in terms of orthogonal coordinates x and y extending in a tangential direction from the origin with the origin of each surface constituting the optical system as a reference, and the coefficient of a term $x^m \cdot y^n$ of a polynomial expression representing a k-th surface is $Ak_{m,n}$, the following conditional expressions (6) to (8) are satisfied.

$$-10^{-1} < A1_{0,2} + A1_{2,0} < 10^{-2} \text{ and } -10^{-1} < A3_{0,2} + A3_{2,0} < 10^{-2} \quad (6)$$

$$|A1_{2,0} - A1_{0,2}| < 10^{-1} \text{ and } |A3_{2,0} - A3_{0,2}| < 10^{-1} \quad (7)$$

$$|A1_{2,0} - A3_{2,0}| < 10^{-2} \text{ and } |A1_{0,2} - A3_{0,2}| < 10^{-2} \quad (8)$$

Thus, the local coordinate (x,y,z) including the orthogonal coordinates x and y of each surface is defined in the same manner as in the above-described case for each curved surface in the light guide member as a part of the optical system.

In this case, an aspheric surface is used in the light guide member, and the degree of freedom of the curved surface shape is effectively used to succeed in obtaining a high image quality optical system. The characteristic of the action of the curved surface is basically the curvature of the curved surface, and the curvature near the origin is primarily determined by the values of the coefficients $Ak_{2,0}$ and $Ak_{0,2}$ (where k=1, 3). For this reason, it is important to appropriately set the values of the coefficients $Ak_{2,0}$ and $Ak_{0,2}$.

The condition (6) specifies the magnitude of the mean curvature of the first surface and the mean curvature of the third surface near the origin. If the magnitude exceeds an upper limit of the condition (6), the first surface and the third surface have a convex shape to the observer, and accordingly, the whole shape increases and aberration correction is difficult. If the magnitude exceeds a lower limit of the condition (6), the curvature is excessively enhanced, aberration correction is not easily performed, and the position of the light guide member becomes close to the face, causing damage to the fit.

The condition (7) specifies the difference between the curvature in the x-axis direction and the curvature in the y-axis direction of the first surface and the third surface. If the difference exceeds an upper limit of the condition (8), astigmatism which is generated in the first surface and the third surface excessively increases, and aberration correction is difficult.

The condition (7) specifies the difference between the curvature of the first surface and the curvature of the third surface relating to the x-axis direction and the y-axis direction, and affects the diopter of the light guide member to external light. If the thickness of the light guide member is T and the refractive index is N, the diopter Dx in the x-axis direction and the diopter Dy in the y-axis direction on the optical axis of the light guide member are given by the following expressions.

$$Dx = 2000(N-1)(A1_{2,0} - A3_{2,0}) + (2T(N-1)/N) \times A1_{2,0} \times A3_{2,0}$$

$$Dy = 2000(N-1)(A1_{0,2} - A3_{0,2}) + (2T(N-1)/N) \times A1_{0,2} \times A3_{0,2}$$

In general, if an error of far diopter exceeds ±1D, displeasure is caused, thus, it is desirable that the diopter of the light guide member is suppressed within a range of ±1D.

The first surface and the third surface have the shape satisfying the conditions (6) to (8), whereby aberration correction of both external light and video light are performed satisfactorily and excellent image quality can be obtained.

In yet another aspect of the invention, a half mirror is formed on the second surface, video light is provided to an observer, a light transmission member is arranged integrally outside the second surface, diopter to external light is substantially set to 0, and external light and video light are provided to the observer in an overlapping manner. In this case, it is possible to reduce defocusing or distortion of external light when observing beyond the second surface.

In still yet another aspect of the invention, the virtual image display apparatus further includes a projection lens which makes video light from the video element enter the light guide member, in which at least a part of the light guide member and the projection lens constitute a relay optical system which forms an intermediate image.

In further another aspect of the invention, the projection lens is constituted by an axisymmetric lens and includes at least one aspheric surface.

In still further another aspect of the invention, the projection lens includes at least one non-axisymmetric aspheric surface.

In yet further another aspect of the invention, the optical system including the light guide member covers a part in front of the eyes of the observer, and a portion where the front of the eyes is not covered may be provided.

In still yet further another aspect of the invention, the video element has a signal light forming unit which emits signal light modulated corresponding to an image, and a scanning optical system which scans signal light entering from the signal light forming unit to emit signal light as scanning light.

In still yet further another aspect of the invention, a virtual image display apparatus may include a light guide member and a video element. The light guide member may include two or more non-axisymmetric curved surfaces and be a part of an optical system. An intermediate image may be formed inside the light guide member. The light guide member may include a first surface and a third surface arranged to face the first surface. The video element may include a display screen and generate video light that is totally reflected by the third surface, is totally reflected by the first surface, is reflected by a second surface, is transmitted through the first surface, and reaches an observation side. In a light beam flux cross-section of a region representing a range of a display screen of the video element that reaches a pupil arrangement position of a pupil of an eye of an observer, a first direction relates to a longitudinal width of the light beam flux cross-section and a second direction relates to a lateral width of the light beam flux cross-section, wherein an A surface position of the light beam flux cross-section is when the width in the first direction is WAx and the width in the second direction is WAy, and wherein an B surface position of the light beam flux cross-section is when the width in the first direction is WBx and the width in the second direction is WBy, such that the conditional expressions (1) and (2) are established:

$$WAx < WAy \quad (1)$$

$$WBy < WBx \quad (2).$$

In still yet further another aspect of the invention, a virtual image display apparatus may include a light guide member and a video element. The light guide may be configured to form an intermediate image therein and may include a first surface and a third surface arranged with the first surface so that the first and third surfaces face each other. The video element may include a display screen and generates video light that is reflected by the third surface, is reflected by the first surface, is reflected by a second surface, is transmitted through the first surface, and reaches an observation side. In a cross-section of a light beam flux of a region representing a range of an entire display screen of the video element that reaches a pupil of an eye of an observer, a surface position of the light beam flux cross-section includes a horizontal position or a vertical position. The horizontal position may be defined as a longitudinal width in a first direction being longer than a lateral width in a second direction, and the vertical position is defined as the longitudinal width in the first direction being shorter than the lateral width in the second direction.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of a virtual image display apparatus according to the invention will be described in detail referring to FIG. 1 and the like.

Figure 1:
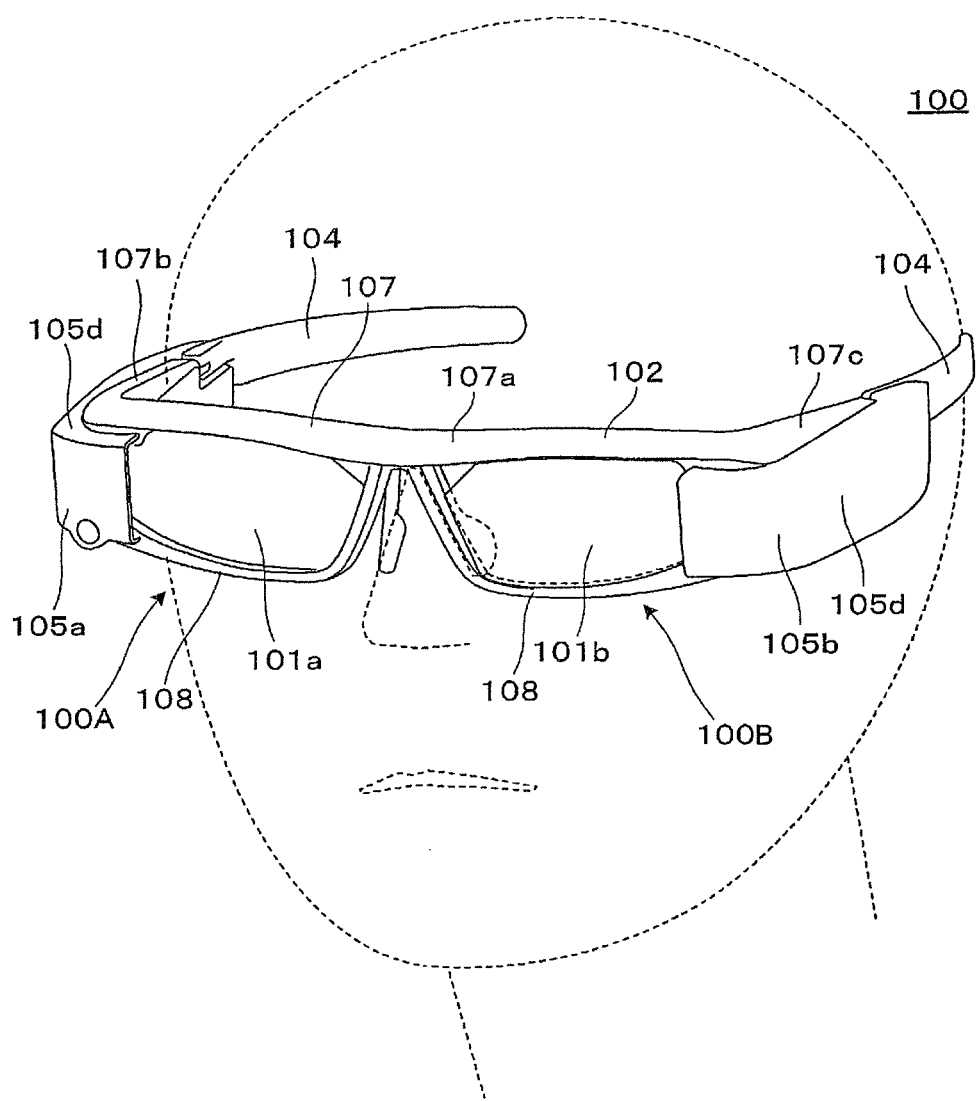
FIG. 1 is a perspective view illustrating the appearance of a virtual image display apparatus according to an embodiment of the invention.

As shown in FIG. 1, a virtual image display apparatus 100 of this embodiment is a head-mounted display which has an appearance like glasses, and can allow an observer or a user who mounts the virtual image display apparatus 100 to visually recognize image light by a virtual image and allow the observer to visually recognize or observe an external scene image in a see-through manner. The virtual image display apparatus 100 includes first and second optical members 101a and 101b which cover the front of the eyes of the observer in a see-through manner, a frame part 102 which supports both optical members 101a and 101b, and first and second image forming body parts 105a and 105b which are attached to portions from both of left and right ends of the frame part 102 to rear temple parts (temples) 104. A first display device 100A in which the first optical member 101a and the first image forming body part 105a on the left side of the drawing are combined is a part which forms a virtual image for a right eye, and functions as a virtual image display apparatus singly. A second display device 100B in which the second optical member 101b and the second image forming body part 105b on the right side of the drawing are combined is a part which forms a virtual image for a left eye, and functions as a virtual image display apparatus singly.

Figure 2A:
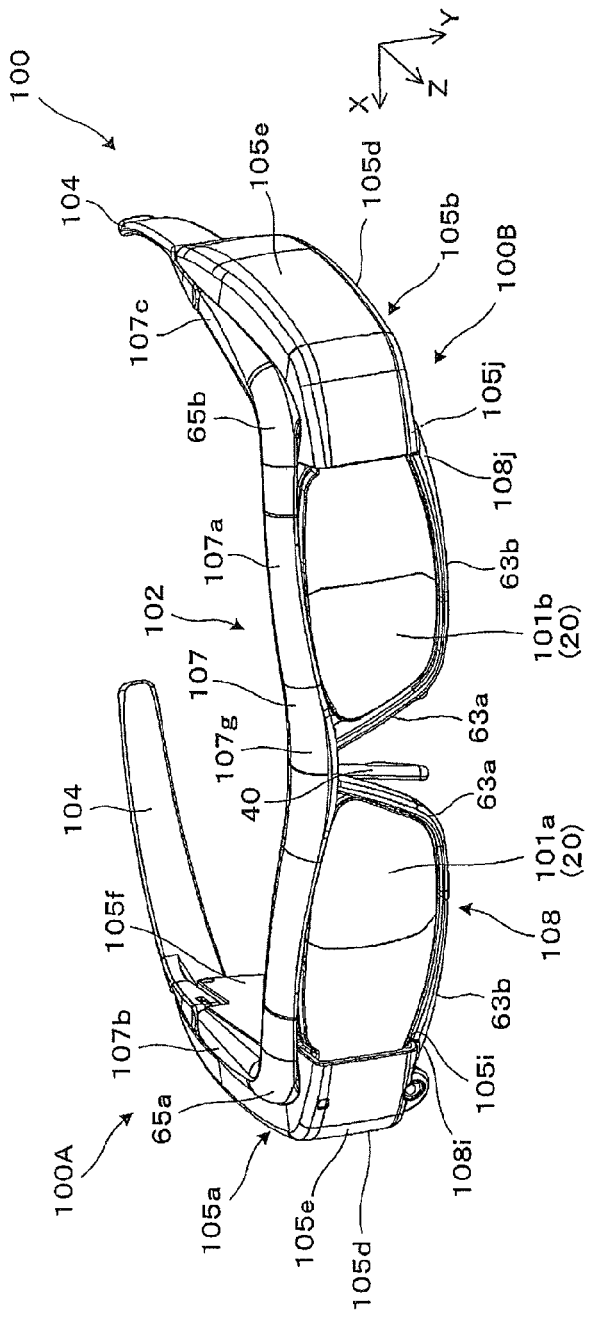
FIG. 2A is an appearance perspective view of the virtual image display apparatus of FIG. 1.
Figure 2B:
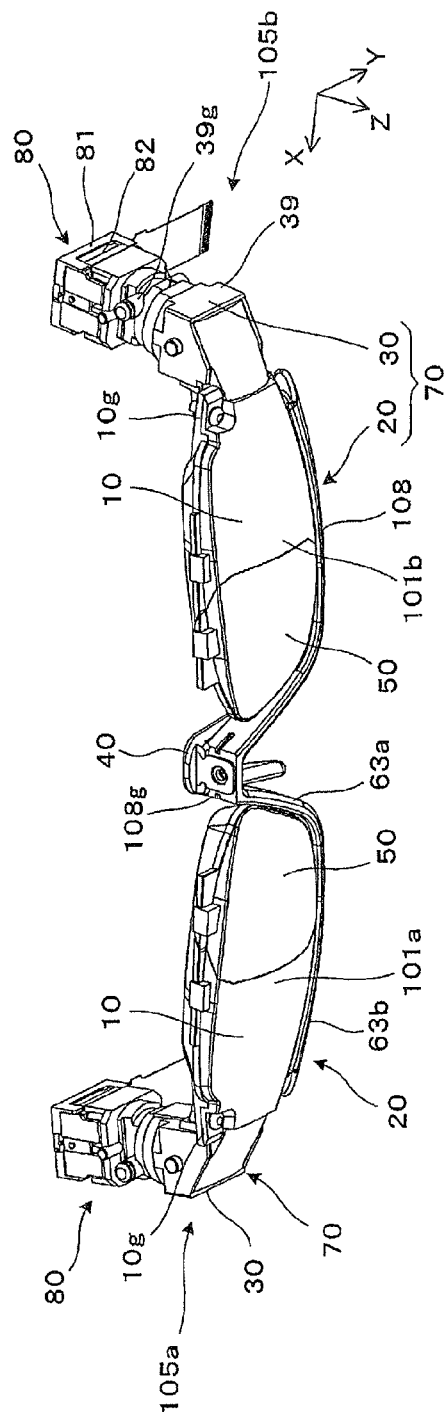
FIG. 2B is a perspective view showing an internal structure in which a frame or an exterior member is removed from the virtual image display apparatus of FIG. 1.

FIG. 2A is a perspective view illustrating the appearance of a front side of the virtual image display apparatus 100, and FIG. 2B is a perspective view of the front side when the virtual image display apparatus 100 is partially disassembled.

As shown in the drawing, the frame part 102 provided in the virtual image display apparatus 100 includes a frame 107 which is arranged on an upper side, and a protector 108 which is arranged on a lower side. In the frame part 102, the frame 107 on the upper side shown in FIG. 2A is an elongated sheet-like member which is bent in a U shape within an XZ plane, and includes a front portion 107a which extends in a right-left horizontal direction (X direction), and a pair of side portions 107b and 107c which extend in a front-back depth direction (Z direction). The frame 107, that is, the front portion 107a and the side portions 107b and 107c are a metal integral component formed of aluminum die casting or various metal materials. The width in the depth direction (Z direction) of the front portion 107a is sufficiently greater than the thickness or width of the light guide device 20 corresponding to the first and second optical members 101a and 101b. On the left side of the frame 107, specifically, in a lateral end portion 65a which is a portion from a left end portion in the front portion 107a to the side portion 107b, the first optical member 101a and the first image forming body part 105a are aligned and directly fixed by screws to be thus supported. On the right side of the frame 107, specifically, in a lateral end portion 65b which is a portion from a right end portion in the front portion 107a to the side portion 107c, the second optical member 101b and the second image forming body part 105b are aligned and directly fixed by screws to be thus supported. The first optical member 101a and the first image forming body part 105a are aligned with each other by fitting, and the second optical member 101b and the second image forming body part 105b are aligned with each other by fitting.

The protector 108 shown in FIGS. 2A and 2B is an under rim-like member, and is arranged and fixed below the frame 107 shown in FIG. 2A. A central portion 108g of the protector 108 is fitted and fixed to a central portion 107g of the frame 107 by screws. The protector 108 is an elongated sheet-like member which is bent in a two-stage crank shape, and is integrally formed of a metal material or a resin material. A first distal end portion 108i of the protector 108 is fixed in a state of being fitted into a concave portion 105i provided in an external member 105e of a cover-like exterior member 105d covering the first image forming body part 105a. A second distal end portion 108j of the protector 108 is fixed in a state of being fitted into a concave portion 105j provided in an external member 105e of an exterior member 105d covering the second image forming body part 105b.

The frame 107 plays a part in not only supporting the first and second image forming body parts 105a and 105b but also protecting the inside of the first and second image forming body parts 105a and 105b in corporation with the exterior member 105d. The frame 107 and the protector 108 are separated from or is in loose contact with an elliptical peripheral portion of the light guide device 20 excluding the root side connected to the first and second image forming body parts 105a and 105b. For this reason, even if there is a difference in coefficient of thermal expansion between the central light guide device 20 and the frame part 102 including the frame 107 and the protector 108, expansion of the light guide device 20 inside the frame part 102 is permitted, whereby it is possible to prevent the occurrence of distortion, deformation, and damage of the light guide device 20.

Abridge part 40 is provided together with the frame 107. The bridge part 40 plays a part in coming into contact with the nose of the observer to support the frame part 102. That is, the frame part 102 is arranged in front of the face of the observer by the bridge part 40 supported by the nose and a pair of temple parts 104 supported by the ears. The bridge part 40 is fixed by screws to be sandwiched between the central portion 107g of the front portion 107a of the frame 107 constituting the frame part 102 and the central portion 108g of the protector 108 constituting the frame part 102.

Figure 3:
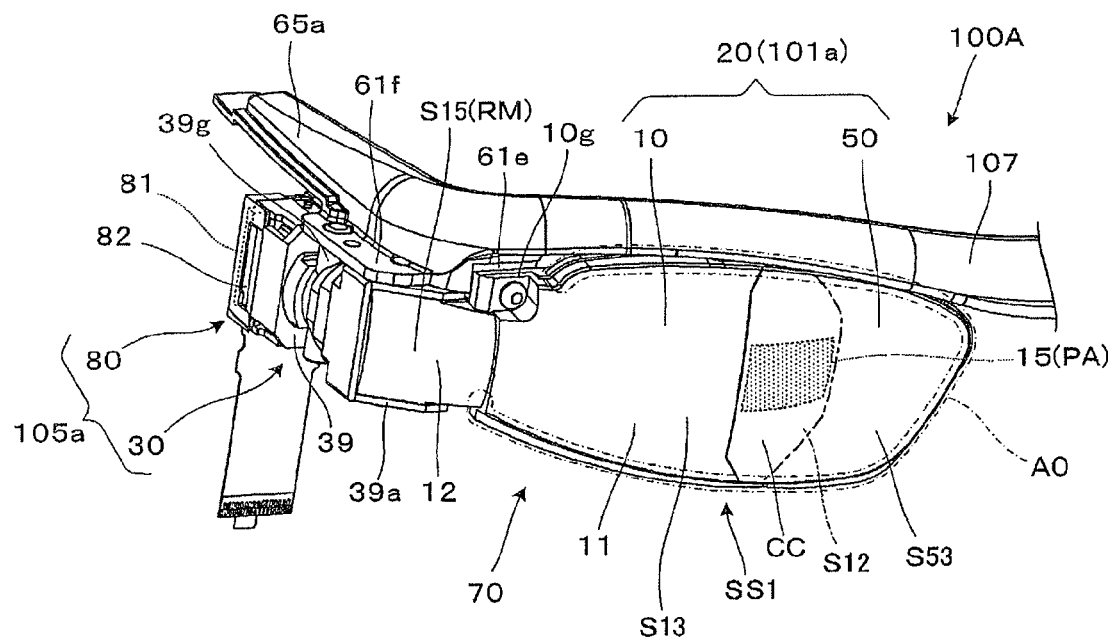
FIG. 3 is a perspective view illustrating the structure of a first display device of the virtual image display apparatus of FIG. 1 and showing a state of an embodiment where an exterior member and the like are removed.

As shown in FIG. 3, the first display device 100A can be considered to include a projection see-through device 70 which is an optical system for projection, and an image display device 80 which forms video light. The projection see-through device 70 plays apart in projecting an image formed by the first image forming body part 105a on the eyes of the observer as a virtual image. The projection see-through device 70 includes a light guide member 10 for light guide and see-through, a light transmission member 50 for see-through, and a projection lens 30 for imaging. That is, the first optical member 101a or the light guide device 20 is constituted by the light guide member 10 and the light transmission member 50, and the first image forming body part 105a is constituted by the image display device 80 and the projection lens 30.

Hereinafter, the image display device 80 and the projection lens 30 constituting the first image forming body part 105a will be described referring to FIGS. 3, 4, and the like.

The image display device 80 has an illumination device 81 which emits illumination light, a video display element 82 which is a transmissive spatial light modulation device, and a drive control unit 84 which controls the operation of the illumination device 81 and the video display element 82.

The illumination device 81 of the image display device 80 has a light source 81a which generates light including three colors of red, green, and blue, and a backlight guide part 81b which diffuses light from the light source to convert light to a light beam flux having a rectangular cross-section. The video display element (video element) 82 is constituted by, for example, a liquid crystal display, and spatially modulates illumination light from the illumination device 81 to form image light to be displayed, such as a motion image. The drive control unit 84 includes a light source drive circuit 84a and a liquid crystal drive circuit 84b. The light source drive circuit 84a supplies power to the illumination device 81 to emit illumination light with stable luminance. The liquid crystal drive circuit 84b outputs an image signal or a drive signal to the video display element (video element) 82, thereby forming color video light or image light to be a source of a motion image or a still image as a transmittance pattern. Although an image processing function can be provided in the liquid crystal drive circuit 84b, the image processing function may be provided in an external control circuit.

The projection lens 30 is a projection optical system which includes three optical elements 31 to 33 as components, and includes a lens barrel 39 which stores and supports the optical elements 31 to 33. The optical elements 31 to 33 are, for example, axisymmetric aspheric lenses, and forms an intermediate image corresponding to a display image of the video display element 82 inside the light guide member 10 in corporation with a part of the light guide member 10. The lens barrel 39 has a rectangular frame-like engagement member 39a on the front end side. The engagement member 39a is engaged with the distal end portion of the light guide member 10 on a second light guide portion 12 side, and enables positioning of the light guide member 10 with respect to the lens barrel 39.

Hereinafter, the function, operation, and the like of the projection see-through device 70 and the like will be described in detail referring to FIG. 4. In the projection see-through device 70, the light guide member 10 which is a part of the prism-type light guide device 20 is an arc-like member which is, for example, bent to follow the face in plan view. In the light guide member 10, a first light guide portion 11 is arranged on the center side near the nose, that is, a light emission side, and has a first surface S11, a second surface S12, and a third surface S13 as a lateral surface having an optical function. A second light guide portion 12 is arranged on a peripheral side separated from the nose, that is, a light incidence side, and has a fourth surface S14 and a fifth surface S15 as a lateral surface having an optical function. Of these, the first surface S11 and the fourth surface S14 are continuously adjacent to each other, and the third surface S13 and the fifth surface S15 are continuously adjacent to each other. The second surface S12 is arranged between the first surface S11 and the third surface S13, and the fourth surface S14 and the fifth surface S15 are adjacent to each other at a large angle.

In the light guide member 10, the first surface S11 is a free-form surface which has, as a local z axis, an emission-side optical axis AXO parallel to the Z axis, the second surface S12 is a free-form surface which has, as a local z axis, an optical axis AX1 included in a reference surface (a cross-section in the drawing) parallel to the XZ plane and inclined with respect to the Z axis, and the third surface S13 is a free-form surface which has, as a local z axis, the emission-side optical axis AXO. The fourth surface S14 is a free-form surface which has, as a local z axis, an optical axis parallel to a bisector of a pair of optical axes AX3 and AX4 included in the reference surface parallel to the XZ plane and inclined with respect to the Z axis, and the fifth surface S15 is a free-form surface which has, as a local z axis, an optical axis parallel to a bisector of a pair of optical axes AX4 and AX5 included in the reference surface parallel to the XZ plane and inclined with respect to the Z axis. On the extension of the optical axis AX5 on the fifth surface S15 side, an incidence-side optical axis AXI is arranged. The first to fifth surfaces S11 to S15 have a symmetrical shape in terms of the vertical Y-axis direction while sandwiching the reference surface (the cross-section in the drawing), which is in parallel with the XZ plane extending in a horizontal direction and through which the optical axes AX1 to AX5 and the like pass.

In particular, among a plurality of surfaces constituting the light guide member 10, at least one free-form surface which is a surface other than a surface from the first surface S11 to the third surface S13 includes at least one point different in sign of curvature depending on direction. With this, it is possible to reduce the size of the light guide member 10 while controlling the light guide of video light accurately. Although the details will be described below in examples, in a case shown in the drawing, the fourth surface S14 on the image display device 80 side from the surface from the first surface S11 to the third surface S13, that is, on the video display element (video element) 82 side has a curved surface shape different in sign of curvature depending on direction at an origin. Hereinafter, a point (the origin of the fourth surface S14) different in sign in curvature depending on direction is referred to as an opposite-sign curvature point P1 (see FIG. 6), and a curved surface (the fourth surface S14) including the opposite-sign curvature point P1 is referred to as an opposite-sign curvature curved surface.

In the light guide member 10, a main body 10s is formed of a resin material having a high light transmission property in a visible region, and is molded by injecting and solidifying thermoplastic resin inside a mold. As the material of the main body 10s, for example, cycloolefin polymer or the like may be used. Although the main body 10s is an integrated product, as described above, the guide member 10 can be considered in the first light guide portion 11 and the second light guide portion 12 functionally. The first light guide portion 11 enables light guide and emission of video light GL and enables see-through of external light HL. The second light guide portion 12 enables incidence and light guide of video light GL.

In the first light guide portion 11, the first surface S11 functions as a refraction surface which emits video light GL outside the first light guide portion 11 and functions as a total reflection surface which totally reflects video light GL on the inner surface side. The first surface S11 is arranged in front of an eye EY, and is formed to have, for example, a concave surface shape to the observer. The first surface S11 is a surface which is formed of a hard coat layer 27 on the surface of the main body 10s.

The second surface S12 is the surface of the main body 10s, and a half mirror layer 15 is attached thereto. The half mirror layer 15 is a reflection film (that is, transflective film) having a light transmission property. The half mirror layer (transflective film) 15 is formed on a narrowed partial area PA of the second surface S12 in terms of the vertical direction along the Y axis of the second surface S12 instead of the entire second surface S12 (see FIG. 3). The half mirror layer 15 is formed by forming a metal reflection film or a dielectric multilayer film on the partial area PA of the underlayer surface of the main body 10s. The reflectance of the half mirror layer 15 to video light GL is set to be equal to or greater than 10% and equal to or less than 50% within an assumed incidence angle range of video light GL from the viewpoint of facilitating the observation of external light HL in a see-through manner. Specifically, the reflectance of the half mirror layer 15 to video light GL in a specific example is set to, for example, 20%, and the transmittance of the half mirror layer 15 of video light GL is set to, for example, 80%.

The third surface S13 functions as a total reflection surface which totally reflects video light GL on the inner surface side. The third surface S13 is arranged in front of the eye EY, and, similarly to the first surface S11, has a concave surface shape to the observer. When external light HL passing through the first surface S11 and the third surface S13 is viewed, diopter is substantially 0. The third surface S13 is a surface which is formed of the hard coat layer 27 on the surface of the main body 10s.

In the second light guide portion 12, the fourth surface S14 functions as a total reflection surface which totally reflects video light GL on the inner surface side. The fourth surface S14 also functions as a refraction surface which makes video light GL enter the second light guide portion 12. That is, the fourth surface S14 doubles as a light incidence surface which makes video light GL enter the light guide member 10 from the outside, and a reflection surface which makes video light GL propagate through the light guide member 10. The fourth surface S14 is a surface which is formed of the hard coat layer 27 on the surface of the main body 10s.

In the second light guide portion 12, as described above, the fifth surface S15 is formed by forming a light reflection film RM formed of an inorganic material on the surface of the main body 10s, and functions as a reflection surface.

As described above, the light transmission member 50 is fixed integrally with the light guide member 10 and is constituted as the single light guide device 20. The light transmission member 50 is a member (auxiliary optical block) which assists a see-through function of the light guide member 10, and has a first transmission surface S51, a second transmission surface S52, and a third transmission surface S53 as a lateral surface having an optical function. The second transmission surface S52 is arranged between the first transmission surface S51 and the third transmission surface S53. The first transmission surface S51 is on a curved surface extended from the first surface S11 of the light guide member 10, the second transmission surface S52 is a curved surface which is bonded integrally to the second surface S12 by an adhesive layer CC, and the third transmission surface S53 is on a curved surface extended from the third surface S13 of the light guide member 10. Of these, the second transmission surface S52 and the second surface S12 of the light guide member 10 are integrated by bonding through the thin adhesive layer CC, and thus have a shape having the substantially same curvature.

The light transmission member (auxiliary optical block) 50 exhibits a high light transmission property in a visible region, and a main body portion of the light transmission member 50 is formed of thermoplastic resin having the substantially same refractive index as the main body 10s of the light guide member 10. The light transmission member 50 is formed by hard coat deposition along with the main body 10s in a state where the main body portion is bonded to the main body 10s of the light guide member 10. That is, similarly to the light guide member 10, in the light transmission member 50, a hard coat layer 27 is formed on the surface of the main body portion. The first transmission surface S51 and the third transmission surface S53 are surfaces which are formed of the hard coat layer 27 on the surface of the main body portion.

Hereinafter, the optical path of video light GL or the like in the virtual image display apparatus 100 will be described. Video light GL emitted from the video display element (video element) 82 is converged by the projection lens 30 and enters the fourth surface S14 having positive refractive power provided in the light guide member 10.

Video light GL passing through the fourth surface S14 of the light guide member 10 advances while being converged, when passing through the second light guide portion 12, is reflected by the fifth surface S15 having comparatively weak negative refractive power, enters the fourth surface S14 from the inside again, and is then reflected.

Video light GL reflected by the fourth surface S14 of the second light guide portion 12 enters and is totally reflected by the third surface S13 having comparatively weak positive refractive power in the example shown in the drawing in the first light guide portion 11, and enters and is totally reflected by the first surface S11 having comparatively weak negative refractive power in the example shown in the drawing. Before and after passing through the third surface S13, video light GL forms an intermediate image in the light guide member 10. An image surface II of the intermediate image corresponds to an image surface OI of the video display element 82.

While video light GL totally reflected by the first surface S11 enters the second surface S12, in particular, video light GL entering the half mirror layer 15 is partially transmitted through and partially reflected by the half mirror layer 15 and enters and passes through the first surface S11 again. The half mirror layer 15 acts as having comparatively strong positive refractive power to video light GL to be reflected by the half mirror layer 15. The first surface S11 acts as having negative refractive power in the example shown in the drawing to video light GL passing therethrough.

Video light GL passing through the first surface S11 enters the pupil of the eye EY of the observer or an equivalent position as a substantially parallel light beam flux. That is, the observer observes an image formed on the video display element (video element) 82 by video light GL as a virtual image.

Out of external light HL, a light component which enters a +X side from the second surface S12 of the light guide member 10 passes through the third surface S13 and the first surface S11 of the first light guide portion 11, and at this time, positive and negative refractive power are cancelled and aberration is corrected. That is, the observer observes an external scene image with little distortion over the light guide member 10. Similarly, out of external light HL, a light component which enters a −X side from the second surface S12 of the light guide member 10, that is, a light component which enters the light transmission member 50 passes through the third transmission surface S53 and the first transmission surface S51 provided in the light transmission member 50, and at this time, positive and negative refractive powers are cancelled and aberration is corrected. That is, the observer observes an external scene image with little distortion over the light transmission member 50. Out of external light HL, a light component which enters the light transmission member 50 corresponding to the second surface S12 of the light guide member 10 passes through the third transmission surface S53 and the first surface S11, and at this time, positive and negative refractive powers are cancelled and aberration is corrected. That is, the observer observes an external scene image with little distortion over the light transmission member 50. The second surface S12 of the light guide member 10 and the second transmission surface S52 of the light transmission member 50 have the substantially same curved surface shape and the substantially same refractive index, and the gap between both surfaces is filled with the adhesive layer CC having the substantially same refractive index. That is, the second surface S12 of the light guide member 10 or the second transmission surface S52 of the light transmission member 50 does not act as a refraction surface to external light HL.

However, since external light HL entering the half mirror layer 15 is partially transmitted through and partially reflected by the half mirror layer 15, external light HL from a direction corresponding to the half mirror layer 15 is vulnerable to the transmittance of the half mirror layer 15. On the other hand, since video light GL is entered from a direction corresponding to the half mirror layer 15, the observer observes an external scene image along with an image formed on the video display element (video element) 82 in the direction of the half mirror layer 15.

Out of video light GL which propagates through the light guide member 10 and enters the second surface S12, a light component which has not been reflected by the half mirror layer 15 enters the light transmission member 50, and is prevented from being returned to the light guide member 10 by an antireflection portion (not shown) provided in the light transmission member 50. That is, video light GL passing through the second surface S12 is prevented from being returned on the optical path and becoming stray light. Furthermore, external light HL which enters from the light transmission member 50 side and reflected by the half mirror layer 15 is returned to the light transmission member 50, and is prevented from being emitted to the light guide member 10 by the antireflection portion (not shown) provided in the light transmission member 50. That is, external light HL reflected by the half mirror layer 15 is prevented from being returned on the optical path and becoming stray light.

As described above, for example, a surface, such as the fourth surface S14, which has the opposite-sign curvature curved surface including the opposite-sign curvature point P1 on an assumption of oblique incidence is provided, whereby it is possible to control the light guide of video light GL accurately and to maintain high performance while suppressing an increase in the size of the light guide member 10. However, when an optical system which includes a non-axisymmetric free-form surface, such as the fourth surface S14, different in curvature between the horizontal direction (first direction) and the vertical direction (second direction) is configured, there is a difference in the degree of convergence of the light beam flux depending on direction, and a virtual image is formed while controlling so-called astigmatism. In contrast, the optical system which configures the virtual image display apparatus 100 according to this embodiment is configured such that there are a position where the light beam flux cross-sectional shape of a total light beam flux of video light GL within an effective range is vertically long and a position where the light beam flux cross-sectional shape is horizontally long between the position of the image surface OI of the video display element 82 and the image surface II of the intermediate image shown in FIG. 4. With this, video light GL which passes through the light guide member 10 having a curved surface difference in curvature depending on direction for aberration control is in a clear state when emitted to the eye EY of the observer, and a satisfactory image can be visually recognized. Here, while the projection lens 30 is an axisymmetric optical system, the light guide member 10 is a non-axisymmetric optical system. For this reason, when the projection lens 30 and a part of the light guide member 10 are regarded as a single optical system which is configured from the position of the image surface OI to the position of the image surface II, the optical system is a non-axisymmetric optical system as a whole. Accordingly, it is important that the optical system between the image surface OI and the image surface II is configured to include an axisymmetric optical system portion taking into consideration the influence of astigmatism.

Hereinafter, the cross-sectional shape of the light beam flux of video light GL in the optical system of the virtual image display apparatus 100 from the image surface OI to the image surface II will be described in detail referring to FIGS. 4 and 5.

Figure 4:
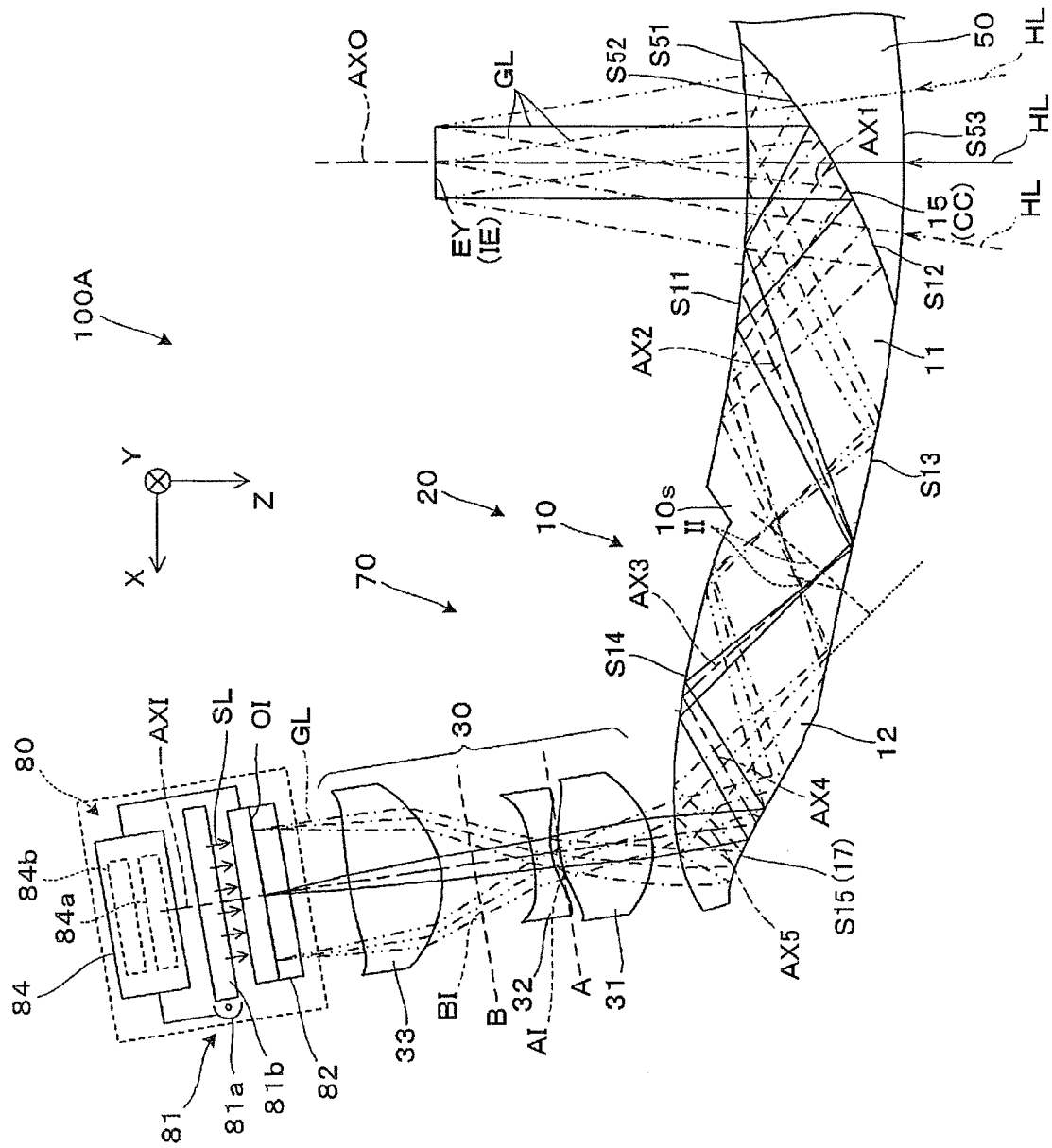
FIG. 4 is a sectional view of a main body portion of the first display device constituting the virtual image display apparatus of FIG. 1 in plan view.
Figure 5A:
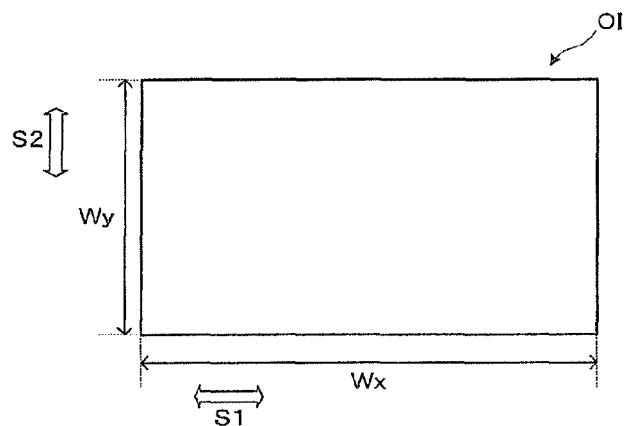
FIG. 5A is a diagram showing a region of an entire display screen of a video display element according to one embodiment.

First, in FIG. 4, the entire display screen by the total light beam flux of video light GL within an effective range to reach a pupil arrangement position IE to be the position of the eye EY in the image surface OI of the video display element 82 becomes a horizontally long region, as shown in FIG. 5A. Here, in the image surface OI represented by the horizontally long region, a direction in which a long side Wx extends is referred to as a longitudinal direction S1, and a direction in which a short side Wy extends is referred to as a lateral direction S2. In other words, in the drawing, the long side Wx represents the full width of the image surface OI in the longitudinal direction S1, and the short side Wy represents the full width of the image surface OI in the lateral direction S2. The longitudinal direction S1 is a direction parallel to the XZ plane in FIG. 4, and the lateral direction S2 is a direction parallel to the YZ plan in FIG. 4.

In FIG. 4, a first surface position A is a position (A surface position) where the width in the first direction corresponding to the longitudinal direction S1 of the image surface OI for the light beam flux cross-section of video light GL within the effective range becomes minimum, and a second surface position B is a position (B surface position) where the width in the second direction corresponding to the lateral direction S2 for the light beam flux cross-section of video light GL within the effective range becomes minimum. In this embodiment, the cross-section of the light beam flux at the position A and the cross-section of the light beam flux at the position B have shapes different in aspect ratio. In the case shown in the drawing, the position A is relatively close to the image surface II of the intermediate image, and the position B is relatively close to the image surface OI of the video display element 82.

Figures 5B, 5C:
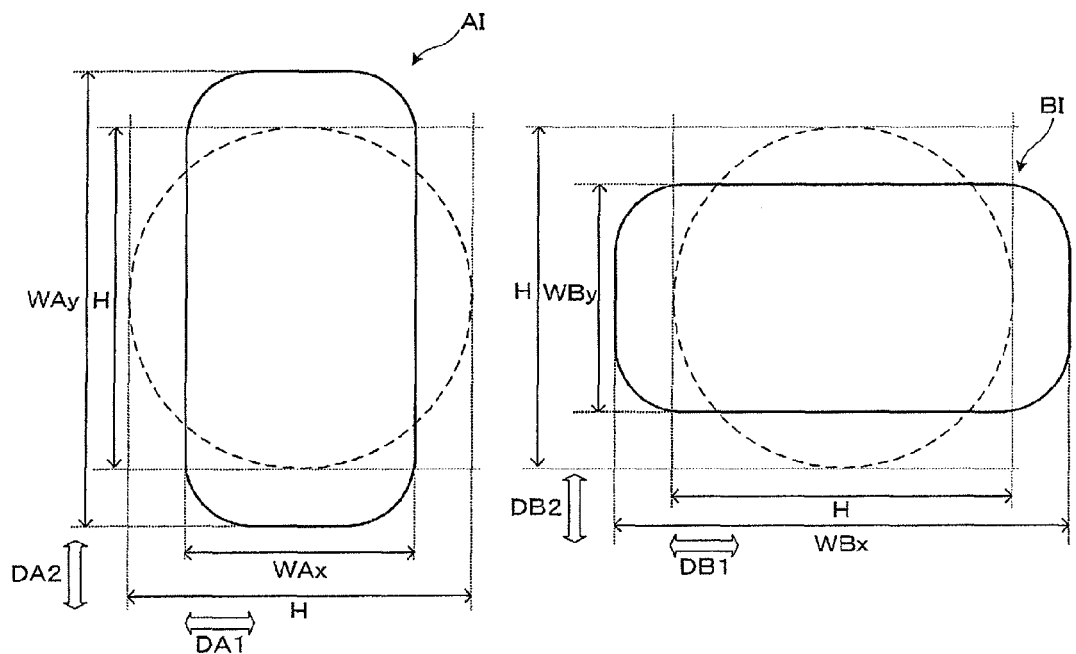
FIG. 5B is a diagram schematically showing a light beam flux cross-sectional shape at a first surface position with respect to the size of a pupil of an eye according to one embodiment.
FIG. 5C is a diagram schematically showing a light beam flux cross-sectional shape at a second surface position with respect to the size of a pupil of an eye according to one embodiment.

First, as shown in FIG. 5B, at the position A, the light beam flux cross-sectional shape of the total light beam flux of video light GL within the effective range becomes a vertically long region. Specifically, in the light beam flux cross-section AI of the light beam flux at the position A, if the width in a first direction DA1 corresponding to the longitudinal direction S1 of FIG. 5A is WAx, and the width in a second direction DA2 corresponding to the lateral direction S2 of FIG. 5A is WAy, the following relationship is established.

$$WAx < WAy \quad (1)$$

From how to specify the position A, the width WAx is the minimum as a length corresponding to Wx (see FIG. 5A) which is the full width in the longitudinal direction S1 in the light beam flux cross-section of video light GL on the optical path.

As shown in FIG. 5C, at the position B, the light beam flux cross-sectional shape of the total light beam flux of video light GL within the effective range becomes a horizontally long region. Specifically, in the light beam flux cross-section BI of the light beam flux at the position B, if the width in a first direction DB1 corresponding to the longitudinal direction S1 of FIG. 5A is WBx, and the width in a second direction DB2 corresponding to the lateral direction S2 of FIG. 5A is WBy, the following relationship is established.

$$WBy < WBx \quad (2)$$

From how to specify the position B, the width WBy is the minimum as a length corresponding to Wy (see FIG. 5A) which is the full width in the lateral direction S2 in the light beam flux cross-section of video light GL on the optical path. As shown in Expressions (1) and (2), in this embodiment, while the shape of the light beam flux cross-section BI is horizontally long the same as the shape of the image surface OI at the position B close to the image surface OI of the video display element 82, the shape of the light beam flux cross-section AI is vertically long unlike the shape of the image surface OI at the position A close to the image surface II of the intermediate image. In other words, there is a place where the magnitude of the ratio of the full width is replaced in terms of a direction corresponding to the longitudinal direction S1 and a direction corresponding to the lateral direction S2 at a position between the switched image surface OI and the image surface II.

As described above, for example, the free-form surfaces constituting the light guide member 10 are different in curvature in the vertical direction and the horizontal direction, and in a configuration in which a component of video light obliquely enters and are reflected by these surfaces, this corresponds to the occurrence of astigmatism. In a situation in which astigmatism of the pupil is not generated, the first surface position A and the second surface position B match each other, that is, the position where the width in the first direction becomes minimum and the position where the width in the second direction becomes minimum are substantially aligned with each other. In this case, for example, a substantially circular light beam flux cross-section is formed at the substantially same position. However, in a configuration of an HMD in which an optical system having no non-axisymmetric surface limits a shape to be small and lightweight, and light which is entered from an oblique direction should be reflected, it is very difficult to realize a virtual image display apparatus which has a wide viewing angle and high performance. In contrast, in this embodiment, the light beam flux is controlled using the non-axisymmetric optical system, whereby it is possible to form an image with a wide viewing angle and high performance in a situation in which there is a limit to shape, or the like. At this time, with the occurrence of astigmatism associated with the use of the non-axisymmetric optical system, as shown in Expressions (1) and (2), the shape of the light beam flux cross-section is different at the position A and the position B. With the above, in the virtual image display apparatus 100 of this embodiment, it is possible to allow an image with suppressed aberration toward the eyes while reducing the size of the whole optical system.

In the above-described configuration, in terms of the position of the image surface II of the intermediate image, the imaging position in the first direction (horizontal direction) is on the optical path downstream side from the imaging position in the second direction (vertical direction), that is, is close to the pupil arrangement position IE where the eye EY of the observer should be arranged.

Figure 5D:
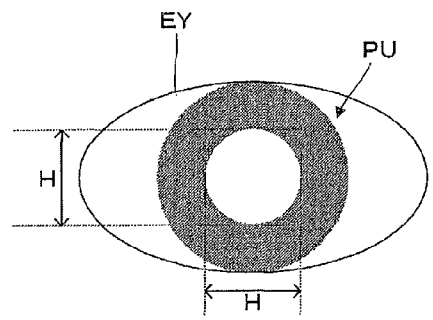
FIG. 5D is a diagram showing a pupil of an eye according to one embodiment.

With respect to a reference value H over the magnitude of the diameter of a pupil PU of the eye EY shown in FIG. 5D, as shown in FIGS. 5B and 5C, the following relationships are established.

$$WAx < H < WAy \quad (4)$$

$$WBy < H < WBx \quad (5)$$

The size of the pupil PU of the eye EY illustrated in FIG. 5D, that is, the pupil diameter usually changes in a range of about 2 mm to 7 mm. Here, a mean pupil diameter is taken, and the reference value H of the size of the pupil PU is set to 5 mm. The reference value H can be appropriately determined, for example, in a range of once to twice the size of the pupil PU considering the configuration of the optical system of the entire virtual image display apparatus 100 or the movement of the position of the pupil. The size of the pupil PU is used as a reference, whereby it is possible to improve optical performance without increasing the size of the light guide member or increasing the power of the lens constituting the optical system.

Figure 6:
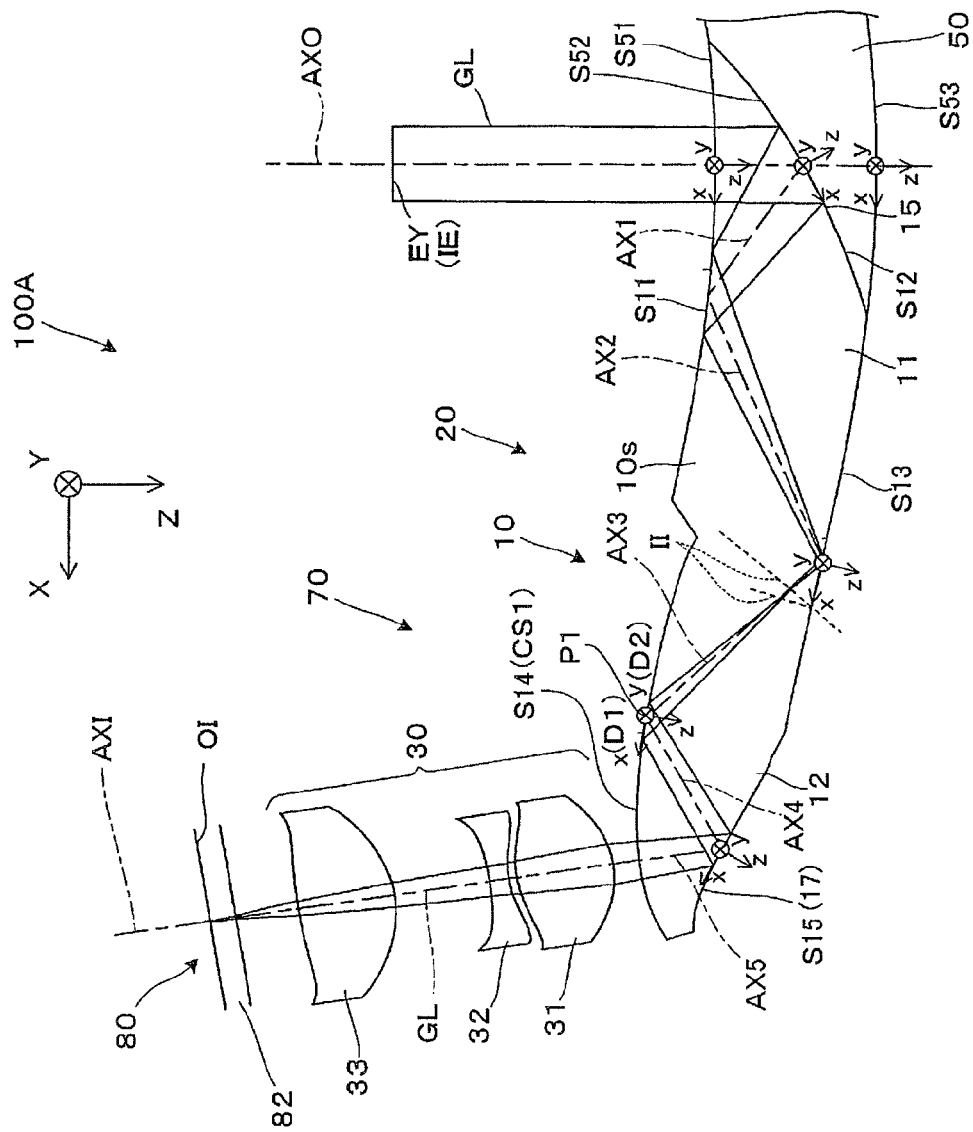
FIG. 6 is a sectional view illustrating an optical surface or an optical path in a light guide member of the first display device according to one embodiment.

FIG. 6 is a diagram illustrating the optical axes AX1 to AX4 in the light guide member 10 or local coordinates. In the following description, considering the evaluation of the optical system or convenience of expression, an optical surface or an optical path is specified in terms of a reversing direction from the eye EY of the observer toward the video display element 82 of the image display device 80. In an actual optical system, while light emitted from the video display element 82 sequentially passes through the projection lens 30 and the light guide member 10 and reaches the eye EY, in this state, the evaluation of the optical system is difficult. For this reason, evaluation and design are performed assuming that light from an infinitely distant light source from a stop at the position of the eye EY enters the light guide member 10 and is imaged on the video display element 82 through the projection lens 30, and data of the optical system described below in detail is displayed in this order. The light transmission member 50 which is bonded to the light guide member 10 and used integrally is the extension of the shape of the light guide member 10, and description thereof will be omitted.

In the light guide member 10 shown in the drawing, the optical axis of the first surface S11 matches the emission-side optical axis AXO, and the local coordinate (x,y,z) of the first surface S11 has a translational relationship with a global coordinate (X,Y,Z) and has an origin on the first surface S11. That is, a z direction of the local coordinate is an advancing direction (a reversing direction of a light beam) on the emission-side optical axis AXO, and a y direction of the local coordinate is in parallel with the Y direction of the global coordinate. In the subsequent surfaces, the y direction of the local coordinate is in parallel with the Y direction of the global coordinate.

The optical axis of the second surface S12 is appropriately inclined with respect to the emission-side optical axis AXO, and the local coordinate of the second surface S12 is appropriately rotated around the Y axis and translated with respect to the global coordinate and has an origin on the second surface S12. A z direction of the local coordinate of the second surface S12 is an intermediate direction between the emission-side optical axis AXO and the optical axis AX1 at the center of a light beam flux from the second surface S12 toward the first surface S11.

The optical axis of the third surface S13 matches the emission-side optical axis AXO, and the local coordinate of the third surface S13 has a translational relationship with the global coordinate and has an origin on the extended surface of the third surface S13, that is, on the third transmission surface S53.

With the above, an intermediate direction between the optical axis AX1 at the center of a light beam flux from the second surface S12 toward the first surface S11 and the optical axis AX2 at the center of a light beam flux from the first surface S11 toward the third surface S13 matches a direction normal to the first surface S11 at the center (an intersection point of the optical axes AX1 and AX2) of a light beam flux on the first surface S11. An intermediate direction between the optical axis AX2 at the center of a light beam flux from the first surface S11 toward the third surface S13 and the optical axis AX3 at the center of a light beam flux from the third surface S13 toward the fourth surface S14 matches a direction normal to the third surface S13 at the center (an intersection point of the optical axes AX2 and AX3) of a light beam flux on the third surface S13.

In an optical path from the third surface S13 toward the next fourth surface S14, the local coordinate corresponds to an advancing direction (a reversing direction of a light beam). That is, a z direction of the local coordinate from the third surface S13 to the fourth surface S14 matches the optical axis AX3 at the center of the light beam flux, and a y direction of the local coordinate is in parallel with the Y direction of the global coordinate.

The origin of the local coordinate of the fourth surface S14 is on the fourth surface S14. A z direction of the local coordinate of the fourth surface S14, that is, the optical axis of the fourth surface S14 is a bisector of the optical axis AX3 at the center of the light beam flux from the third surface S13 toward the fourth surface S14 and the optical axis AX4 at the center of the light beam flux from the fourth surface S14 toward the fifth surface S15.

The origin of the local coordinate of the fifth surface S15 is on the fifth surface S15. A z direction of the local coordinate of the fifth surface S15, that is, the optical axis of the fifth surface S15 is a bisector of the optical axis AX4 at the center of the light flux from the fourth surface S14 toward the fifth surface S15 and the optical axis AX5 at the center of the light flux from the fifth surface S15 toward the fourth surface S14.

The shape of the first surface S11 of the light guide member 10 is expressed by the following expression using the local coordinate (x,y,z) of the first surface S11.

$$Z = \Sigma \{A1_{m,n} \cdot (x^m \cdot y^n)\} \quad (9)$$

Here, $A1_{m,n}$ is a coefficient of a (m·n)th term expanded as a polynomial, and m and n are an integer equal to or greater than 0.

The shape of the second surface S12 of the light guide member 10 is expressed by the following expression using the local coordinate (x,y,z) of the second surface S12.

$$z = \Sigma \{A2_{m,n} \cdot (x^m \cdot y^n)\} \quad (10)$$

Here, $A2_{m,n}$ is a coefficient of a (m·n)th term expanded as a polynomial.

The shape of the third surface S13 of the light guide member 10 is expressed by the following expression using the local coordinate (x,y,z) of the third surface S13.

$$z = \Sigma \{A3_{m,n} \cdot (x^m \cdot y^n)\} \quad (11)$$

Here, $A3_{m,n}$ is a coefficient of a (m·n)th term expanded as a polynomial.

In this embodiment, the first to third surfaces S11 to S13 of the light guide member 10 satisfy the following three conditions.

$$-10^{-1} < A1_{0,2} + A1_{2,0} < 10^{-2} \text{ and } -10^{-1} < A3_{0,2} + A3_{2,0} < 10^{-2} \quad (6)$$

$$|A1_{2,0} - A1_{0,2}| < 10^{-1} \text{ and } |A3_{2,0} - A3_{0,2}| < 10^{-1} \quad (7)$$

$$|A1_{2,0} - A3_{2,0}| < 10^{-2} \text{ and } |A1_{0,2} - A3_{0,2}| < 10^{-2} \quad (8)$$

The shapes of the first to third surfaces S11 to S13 are set to satisfy the three conditions, whereby aberration correction of both external light HL and video light GL can be performed satisfactorily and excellent image quality can be obtained.

An interval between the first surface S11 and the third surface S13 of the light guide member 10 is equal to or greater than 5 mm and equal to or less than 15 mm. An inclination angle of the second surface S12 with respect to the first surface S11 is equal to or greater than 20° and equal to or less than 40°.

The fourth surface S14 or the fifth surface S15 of the light guide member 10 is provided for optical path adjustment or more accurate aberration correction.

The shape of the fourth surface S14 of the light guide member 10 is expressed by the following expression using the local coordinate (x,y,z) of the fourth surface S14.

$$z = \Sigma \{A4_{m,n} \cdot (x^m \cdot y^n)\} \quad (12)$$

Here, $A4_{m,n}$ is a coefficient of a (m·n)th term expanded as a polynomial.

The shape of the fifth surface S15 of the light guide member 10 is expressed by the following expression using the local coordinate (x,y,z) of the fifth surface S15.

$$z = \Sigma \{A5_{m,n} \cdot (x^m \cdot y^n)\} \quad (13)$$

Here, $A5_{m,n}$ is a coefficient of a (m·n)th term expanded as a polynomial.

In this embodiment, the curved surface shape of the fourth surface S14 or the fifth surface S15 expressed by Expressions (12) and (13) includes at least one non-axisymmetric point different in curvature depending on direction. Specifically, when, at one point on a certain curved surface, the curvature in a direction (x direction) of the orthogonal coordinate x as one direction of two orthogonal directions is Kx, and the curvature in a direction (y direction) of the orthogonal coordinate y as the other direction of the two orthogonal directions is Ky, asymmetry which satisfies the following relationship is provided.

$$0.005 < |Kx - Ky| \quad (3)$$

In addition to Expressions (1) and (2), a curved surface which satisfies Expression (3) is provided, whereby it is possible to control light and to correct aberration while reducing the size and weight of the virtual image display apparatus 100.

As in the virtual image display apparatus 100 of this embodiment, in the case of an optical system which extends to deflect in the horizontal direction (specific direction) in which the eyes are arranged, the imaging conditions are significantly different between the horizontal direction and the vertical direction perpendicular to the horizontal direction. In contrast, in this embodiment, in the light guide member 10, similarly to the first surface S11 or the like, at least the fourth surface S14 or the fifth surface S15 is one of the main surfaces (principal surfaces) which contribute to light guide, such as reflection or transmission of video light GL, and is a non-axisymmetric curved surface different in curvature in the x direction (first direction D1) corresponding to the horizontal direction in which the eyes are arranged and the y direction (second direction D2) corresponding to the vertical direction orthogonal to the horizontal direction. The optical system of the virtual image display apparatus 100 controls the light beam flux such that, in regard to the width WAx in the first direction DA1 and the width WAy in the second direction DA2 at the first surface position A and the width WBx in the first direction DB1 and the width WBy in the second direction DB2 at the second surface position B corresponding to the width WAx and the width WAy, Expressions (1) and (2) are established. With this, in order to suppress the occurrence of aberration while producing a small and wide viewing angle HMD, for example, in the optical system which includes the light guide member 10 having a free-form surface as a non-axisymmetric surface different in curvature depending on direction, like the fourth surface S14, it is possible to allow video light GL to be emitted in an appropriate state toward the eye EY while controlling the light guide of video light GL accurately and maintaining high performance.

In the virtual image display apparatus 100 of this embodiment, an intermediate image is formed inside the light guide member 10 by the projection lens 30 or the like, and video light GL totally reflected by two or more surfaces in order of the third surface S13, the first surface S11, and the second surface S12 is transmitted through the first surface S11 and reaches the eye EY of the observer. Thus, it is possible to realize bright high-performance display with a wide viewing angle while reducing the thickness of the light guide member 10 to reduce the size and weight of the entire optical system. External light HL can be observed through the first surface S11 and the third surface S13, and diopter at this time is substantially 0. For this reason, it is possible to reduce defocusing or distortion of external light HL when observing external light HL in a see-through manner. The shape of the light guide member 10 can have a shape along the face of the observer, the center of gravity can be brought close to the face, and excellent design can be achieved.

EXAMPLES

Hereinafter, examples of the projection see-through device assembled in the virtual image display apparatus according to the invention will be described. Symbols used in each example are summarized below.

SPH: pupil
FFSk: free-form surface (k in light guide member=surface number)
ASPk: axisymmetric aspheric surface (k in projection optical system=surface number)
SPH: spherical surface or flat surface (protection glass surface)
R: radius of curvature
T: axial surface interval
Nd: refractive index of optical material with respect to d line
Vd: Abbe number of optical material with respect to d line
TLY: inclination angle (°) of optical axis on a cross-section (XZ cross-section) of specific surface (TLY may vary before and after a specific surface)
DCX: deviation of optical axis in X-axis direction on cross-section (XZ cross-section) of specific surface Example 1

In a projection see-through device of Example 1, data on an optical surface constituting a light guide member and a projection lens is shown in Table 1. For example, FFS1 means the first surface S11, FFS2 means the second surface S12, and FFS3 means the third surface S13. Furthermore, ASP1 means an emission surface of a first lens of the projection lens, and ASP2 means an incidence surface of the first lens.

TABLE 1

| No | Type | R | T | Nd | Vd |
|---|---|---|---|---|---|
| 1 | SPH | ∞ | 20.00 | | |
| 2 | FFS1 | — | 5.50 | 1.525 | 55.95 |
| 3 | FFS2 | — | −5.50 | 1.525 | 55.95 |
| 4 | FFS1 | — | 10.00 | 1.525 | 55.95 |
| 5 | FFS3 | — | −20.00 | 1.525 | 55.95 |
| 6 | FFS4 | — | 10.00 | 1.525 | 55.95 |
| 7 | FFS5 | — | −10.00 | 1.525 | 55.95 |
| 8 | FFS4 | — | −0.50 | | |
| 9 | ASP1 | −6.137 | −6.00 | 1.525 | 55.95 |
| 10 | ASP2 | 6.711 | −0.50 | | |
| 11 | ASP3 | 6.613 | −1.20 | 1.585 | 29.90 |
| 12 | ASP4 | −17.825 | −6.00 | | |
| 13 | ASP5 | −7.024 | −6.00 | 1.525 | 55.95 |
| 14 | ASP6 | 32.129 | −3.91 | | |
| 15 | SPH | ∞ | −1.60 | 1.458 | 67.82 |
| 16 | image surface | | | | |

In regard to the optical surface in the light guide member constituting Example 1, the optical axis inclination angle (tilt) TLY on the cross section and the optical axis deviation (decenter) DCX are shown in Table 2. As for the fourth surface S14, the inclination of the angle in a second pass is considered.

TABLE 2

| No | Type | TLY (before surface) | DCX (after surface) | TLY (after surface) |
|---|---|---|---|---|
| 2 | FFS1 | 0 | 0 | 0 |
| 3 | FFS2 | −28 | 0 | 28 |
| 4 | FFS1 | 0 | 0 | 0 |
| 5 | FFS3 | 0 | 23.17 | −44.19 |
| 6 | FFS4 | 53 | 0 | 53 |
| 7 | FFS5 | −35 | 0 | −35 |
| 8 | FFS4 | 0 | 10 | −17.78 |

In regard to each optical surface in the light guide member constituting Example 1, the coefficient $Ak_{m,n}$ expanded as a polynomial of a free-form surface is shown in Table 3. In Table 3, symbols m and n mean variables or degrees in the coefficient $Ak_{m,n}$. A symbol FFSk (where k=1 to 5) means a k-th surface among the first to fifth surfaces S11 to S15 which are free-form surfaces. The coefficient $Ak_{m,n}$ means a coefficient of each term $x^m \cdot y^n$ which constitutes a polynomial expression representing the k-th surface.

TABLE 3

| m | n | FFS1 | FFS2 | FFS3 | FFS4 | FFS5 |
|---|---|------|------|------|------|------|
| 2 | 0 | −6.070E−03 | −1.115E−02 | −5.518E−03 | 7.456E−03 | 7.176E−03 |
| 0 | 2 | −6.428E−03 | −1.033E−02 | −5.843E−03 | −1.928E−02 | −1.403E−02 |
| 3 | 0 | 0.000E+00 | 1.034E−04 | 0.000E+00 | 2.404E−04 | 1.204E−03 |
| 1 | 2 | −2.437E−04 | −8.469E−05 | −2.014E−04 | 7.842E−04 | 2.030E−04 |
| 4 | 0 | 8.234E−07 | −3.110E−06 | 6.185E−07 | 1.602E−05 | 1.512E−04 |
| 2 | 2 | −1.084E−05 | 7.972E−06 | −8.142E−06 | 9.630E−05 | 2.067E−05 |
| 0 | 4 | 3.564E−05 | 1.023E−05 | 2.678E−05 | −1.340E−04 | −2.956E−05 |
| 5 | 0 | 5.154E−08 | −3.707E−08 | 3.520E−08 | −5.360E−07 | 1.381E−05 |
| 3 | 2 | 1.671E−06 | −1.035E−07 | 1.141E−06 | −3.882E−06 | 2.044E−05 |
| 1 | 4 | 0.000E+00 | −5.741E−07 | 0.000E+00 | 4.412E−05 | 4.589E−06 |
| 6 | 0 | −7.659E−10 | 2.404E−08 | −4.755E−10 | −6.913E−09 | −1.274E−06 |
| 4 | 2 | −3.089E−08 | −3.373E−09 | −1.918E−08 | −6.764E−07 | −5.177E−07 |
| 2 | 4 | 4.831E−08 | 7.923E−08 | 3.000E−08 | −8.697E−06 | −1.726E−06 |
| 0 | 6 | −5.048E−07 | −1.852E−07 | −3.134E−07 | 5.804E−05 | 3.361E−06 |

In Table 3 and subsequent tables, digits after E in a numerical value mean a decimal exponent, and for example, "−6.070E−03" means $-6.070 \times 10^{-03}$.

Coefficients of an aspheric surface of the optical surface constituting the projection lens in the projection see-through device of Example 1 are shown in Table 4.

TABLE 4

|   | ASP1 | ASP2 | ASP3 | ASP4 | ASP5 | ASP6 |
|---|------|------|------|------|------|------|
| K | 0 | 0 | 0 | 0 | 0 | 0 |
| B4 | 1.969E−04 | −2.830E−03 | −2.165E−03 | 4.007E−04 | 7.860E−04 | −7.467E−05 |
| B6 | 5.824E−06 | 1.443E−04 | 7.601E−05 | −1.350E−04 | −1.371E−05 | 9.941E−07 |
| B8 | 3.833E−07 | −4.093E−06 | −4.139E−06 | 7.564E−07 | 2.842E−07 | −2.326E−07 |

In Table 4, symbols K and Bi represent coefficients for specifying aspheric surfaces of aspheric surfaces APS1 to APS6 which are lens surfaces of three lenses 31, 32, 33 constituting the projection lens 30. An aspheric surface is specified by the following polynomial expression (aspheric surface expression).

$$z = \frac{(1/R) \times h^2}{1 + \sqrt{1 - (K+1) \times (1/R)^2 \times h^2}} + B_4 h^4 + B_6 h^6 + B_8 h^8 + \ldots$$

Here, R represents a radius of curvature of each surface, h represents the height from the optical axis, K represents a conical coefficient of a target lens surface, and Bi (where i=4, 6, 8, . . . ) represents a high-order aspheric surface coefficient of the target lens surface.

Figure 7:
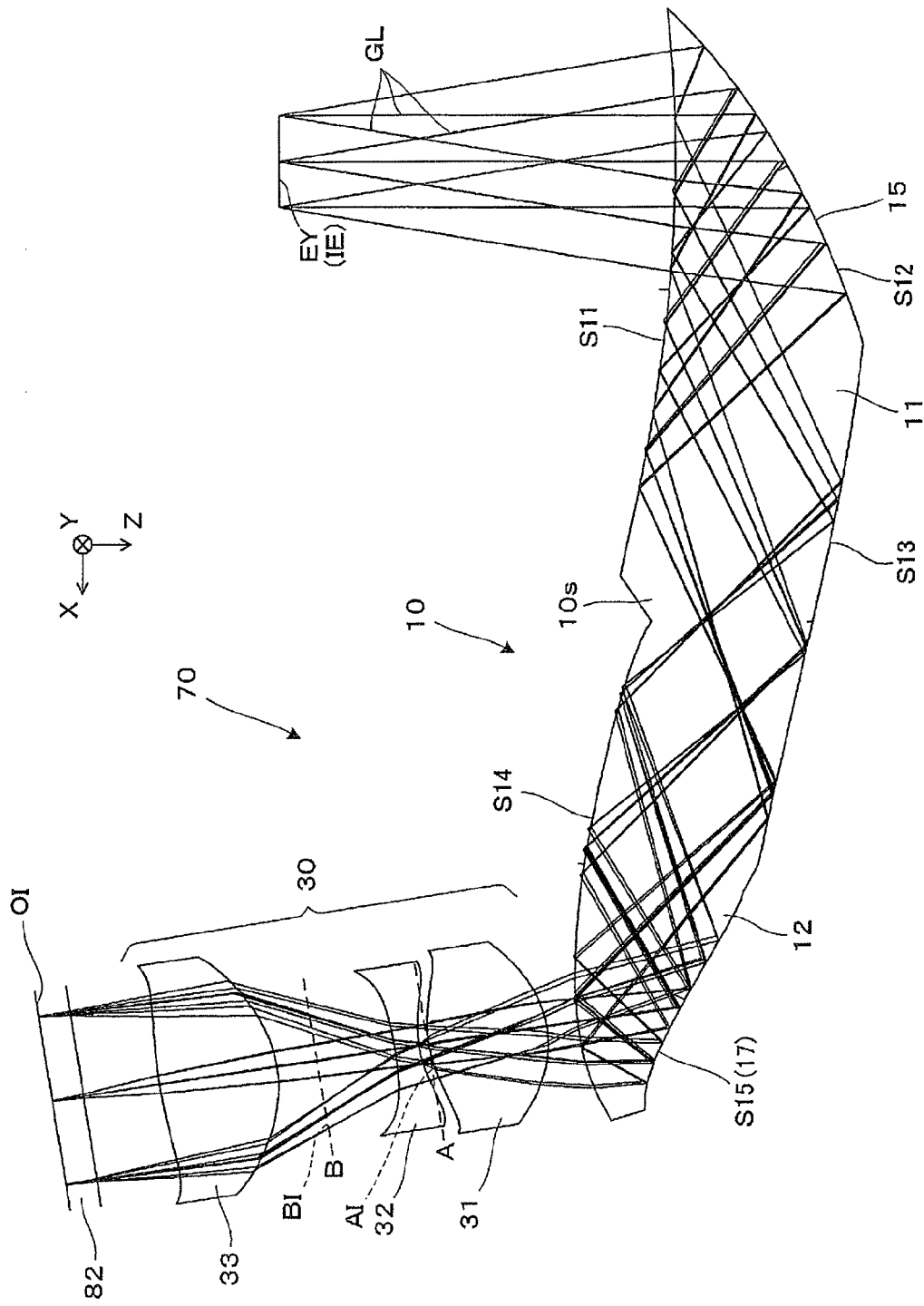
FIG. 7 is a diagram illustrating an optical system of Example 1.

FIG. 7 is a sectional view of the projection see-through device 70 of Example 1. However, a light beam flux is deviated not only on a reference surface SR but also in the Y direction from the reference surface SR. In the projection see-through device 70, the light guide member 10 includes the first surface S11 having weak negative refractive power, the second surface S12 having comparatively strong positive refractive power, the third surface S13 having comparatively weak positive refractive power, the fourth surface S14 having comparatively strong positive refractive power, and the fifth surface S15 having comparatively weak negative refractive power. Here, the fourth surface S14 functions as a reflection surface and a refraction surface. Specifically, the fourth surface S14 is a total reflection surface with respect to a light beam flux (actually, light from the fifth surface S15) reversed from the third surface S13, and is a transmission surface with respect to a light beam flux (actually, light from the projection lens 30) reversed from the fifth surface S15. That is, the fourth surface S14 has both a function of bending the optical path and a function relating to convergence of a light beam flux. The projection lens 30 includes a first lens 31 having positive refractive power, a second lens 32 having negative refractive power, and a third lens 33 having positive refractive power. A specific specification of the optical system of Example 1 is as follows. A horizontal viewing angle is 20.1°, a vertical viewing angle is 11.4°, the size of a display area of the video display element is 9.22×5.18 mm, a pupil diameter is 5 mm, and a focal distance is about 26 mm.

Figure 8A:
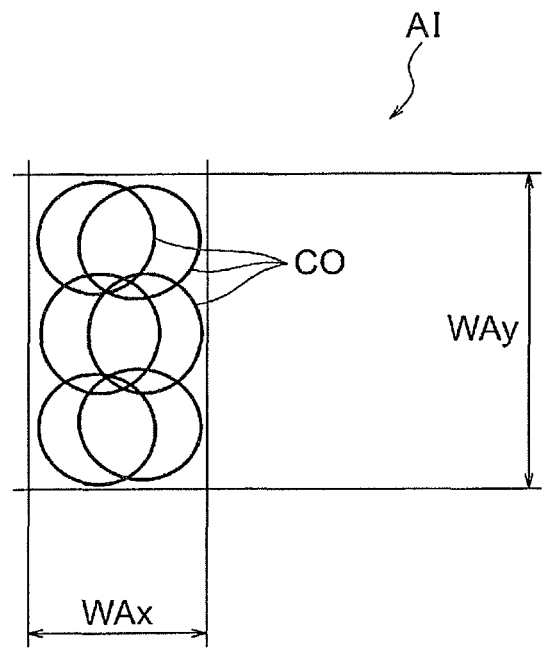
FIG. 8A is a diagram showing a light beam flux cross-sectional shape at a first surface position of Example 1.
Figure 8B:
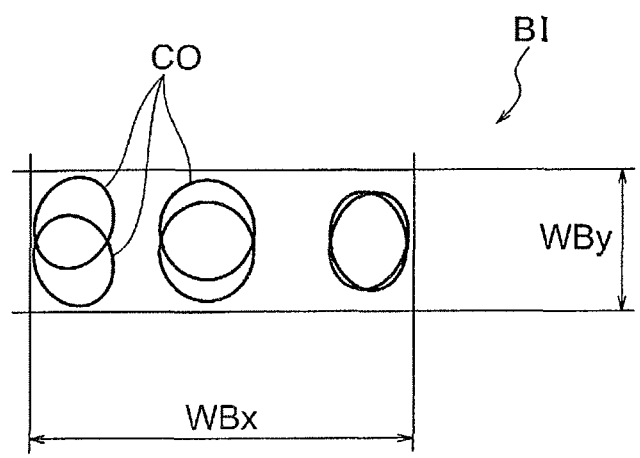
FIG. 8B is a diagram showing a light beam flux cross-sectional shape at a second surface position of Example 1.

FIG. 8A is a diagram showing the shape of a light beam flux cross-section AI at the first surface position A of Example 1, and FIG. 8B is a diagram showing the shape of a light beam flux cross-section BI at the second surface position B of Example 1. As shown in the drawing, the shape of the light beam flux cross-section AI becomes a vertically long shape which satisfies Expression (1), and the shape of the light beam flux cross-section BI becomes a laterally long shape which satisfies Expression (2).

Figure 9A:
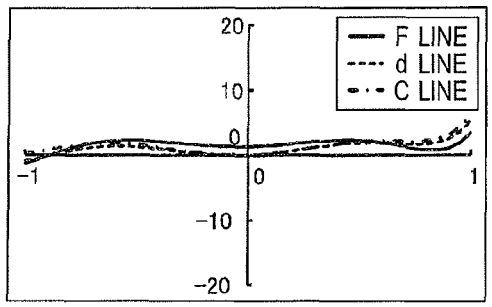
FIGS. 9A, 9B, 9C, 9D, 9E, and 9F are diagrams illustrating aberration of the optical system of Example 1.
Figure 9B:
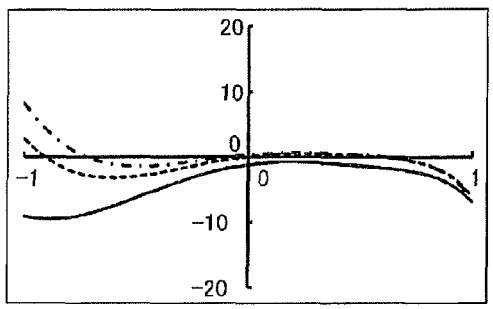
Figure 9C:
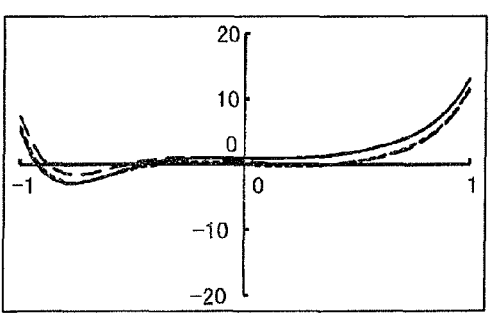
Figure 9D:
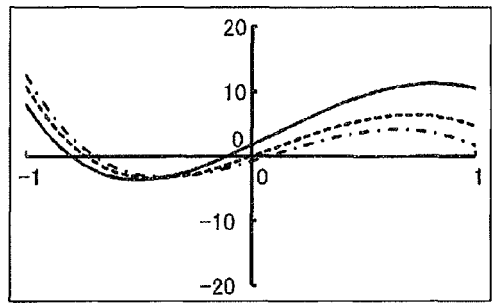
Figure 9E:
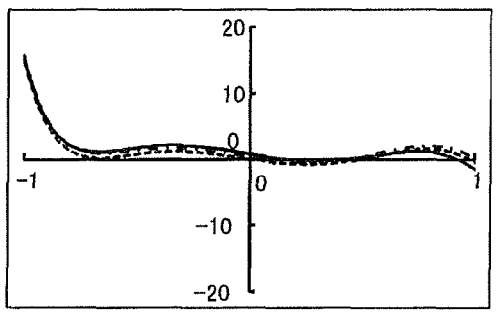
Figure 9F:
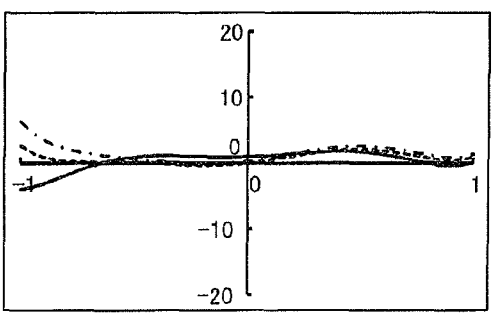
Figure 10A:
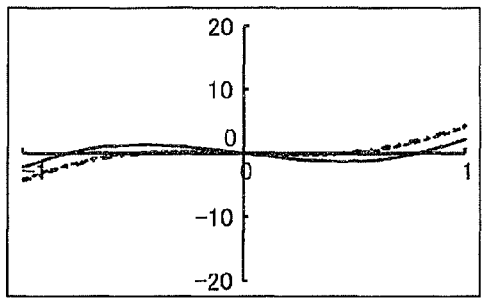
FIGS. 10A, 10B, 10C, 10D, 10E, and 10F are diagrams illustrating aberration of the optical system of Example 1.
Figure 10D:
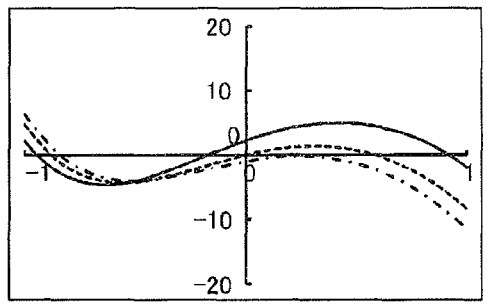
Figure 10B:
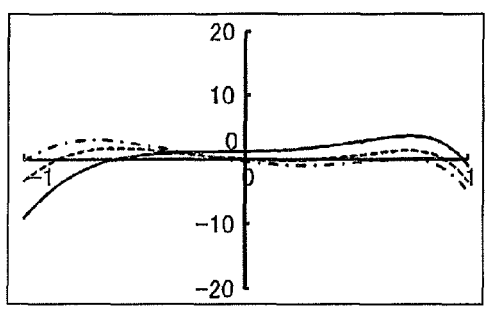
Figure 10E:
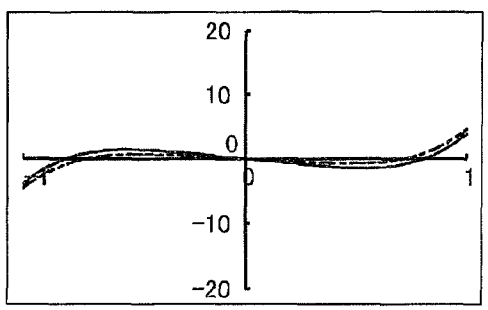
Figure 10C:
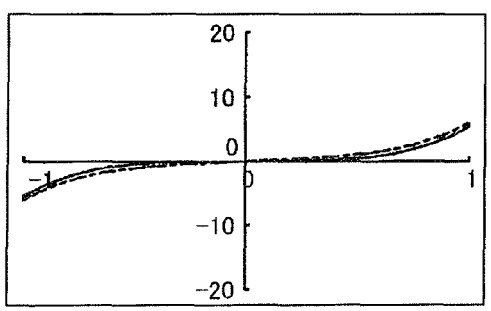
Figure 10F:
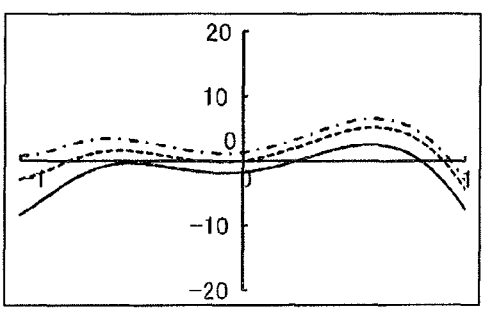

FIGS. 9A to 9F and 10A to 10F show aberration of Example 1. In each aberration diagram, the horizontal axis represents a position in a pupil, and the vertical axis represents the amount of aberration in units of micron. Specifically, FIGS. 9A and 9B show aberration in the Y and X directions at an azimuth of 10° in the X direction and 5.7° in the Y direction, FIGS. 9C and 9D show aberration in the Y and X directions at an azimuth of 0.0° in the X direction and 5.7° in the Y direction, and FIGS. 9E and 9F show aberration in the Y and X directions at an azimuth of −10° in the X direction and 5.7° in the Y direction. FIGS. 10A and 10B show aberration in the Y and X directions at an azimuth of 10° in the X direction and 0.0° in the Y direction, FIGS. 10C and 10D show aberration in the Y and X directions at an azimuth of 0.0° in the X direction and 0.0° in the Y direction, and FIGS. 10E and 10F show aberration in the Y and X directions at an azimuth of −10° in the X direction and 0.0° in the Y direction. The amount of aberration shown in the drawing is the amount of aberration on the image surface of the video display element when a light beam is reversed for convenience.

Example 2

In a projection see-through device of Example 2, data on an optical surface constituting a light guide member and a projection lens is shown in Table 5.

TABLE 5

| No | Type | R | T | Nd | Vd |
|---|---|---|---|---|---|
| 1 | SPH | ∞ | 22.00 | | |
| 2 | FFS1 | — | 5.50 | 1.525 | 55.95 |
| 3 | FFS2 | — | −5.50 | 1.525 | 55.95 |
| 4 | FFS1 | — | 10.00 | 1.525 | 55.95 |
| 5 | FFS3 | — | −20.00 | 1.525 | 55.95 |
| 6 | FFS4 | — | 14.00 | 1.525 | 55.95 |
| 7 | FFS5 | — | −10.00 | 1.525 | 55.95 |
| 8 | FFS6 | — | −2.00 | | |
| 9 | ASP1 | −20.674 | −7.00 | 1.525 | 55.95 |
| 10 | ASP2 | 9.056 | −0.50 | | |
| 11 | ASP3 | 7.190 | −1.00 | 1.585 | 29.90 |
| 12 | ASP4 | 54.244 | −19.37 | | |
| 13 | ASP5 | −10.384 | −8.15 | 1.525 | 55.95 |
| 14 | ASP6 | −23.928 | −4.98 | | |
| 15 | SPH | ∞ | −1.60 | 1.458 | 67.82 |
| 16 | image surface | | | | |

In regard to the optical surface in the light guide member constituting Example 2, the optical axis inclination angle (tilt) TLY on the cross section and the optical axis deviation (decenter) DCX are shown in Table 6.

TABLE 6

| No | Type | TLY (before surface) | DCX (after surface) | TLY (after surface) |
|---|---|---|---|---|
| 2 | FFS1 | 0 | 0 | 0 |
| 3 | FFS2 | −29 | 0 | 29 |
| 4 | FFS1 | 0 | 0 | 0 |
| 5 | FFS3 | 0 | 24.171 | −39.58 |
| 6 | FFS4 | 50 | 0 | 50 |
| 7 | FFS5 | −50 | 0 | −50 |
| 8 | FFS6 | 0 | 0 | 0 |

Figure 11:
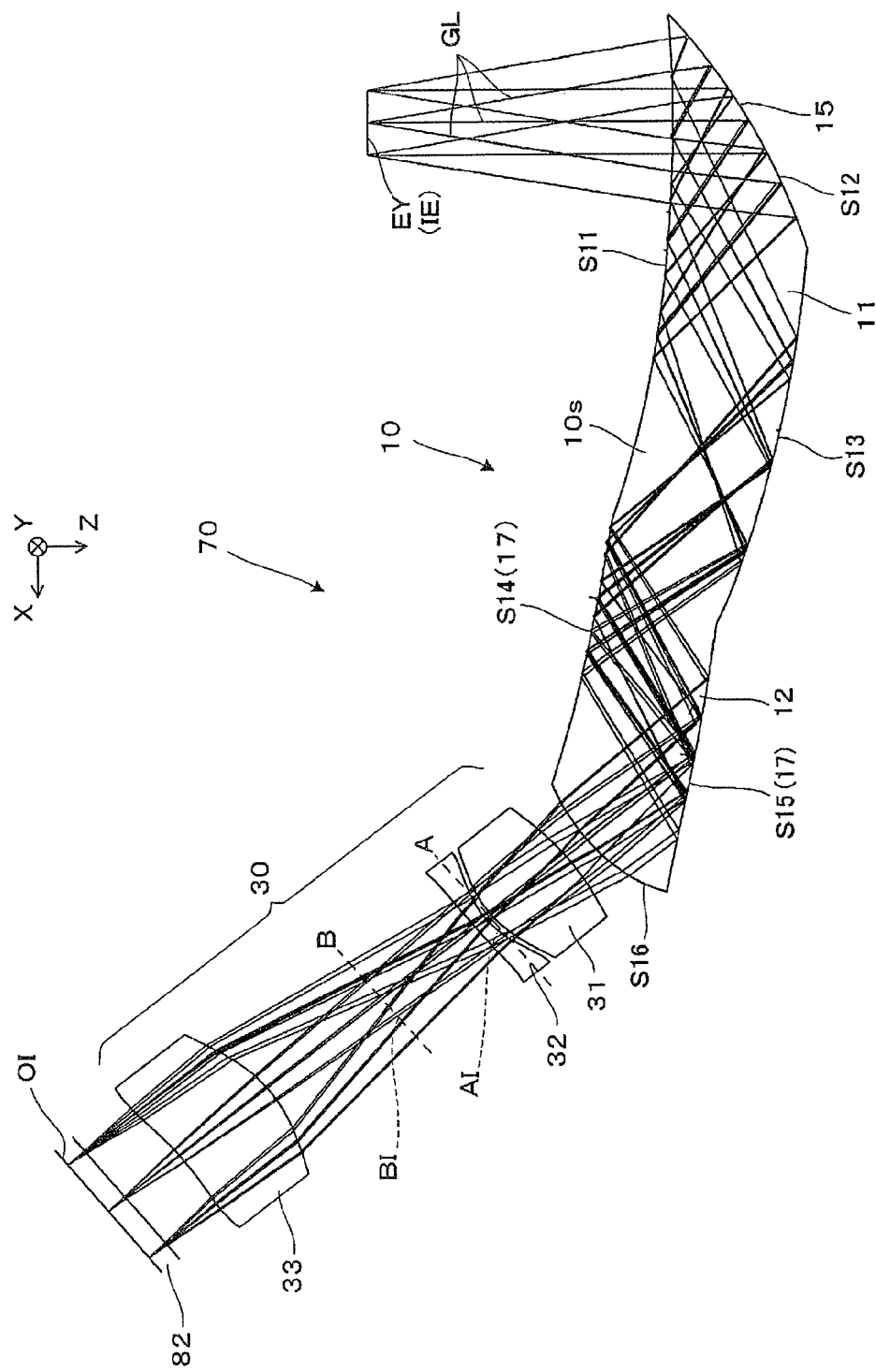
FIG. 11 is a diagram illustrating an optical system of Example 2.

In regard to each optical surface in the light guide member constituting Example 2, the coefficient expanded as a polynomial of a free-form surface is shown in Table 7. In Table 7, symbols m and n mean variables or degrees in the coefficient $Ak_{m,n}$. A symbol FFSk (where k=1 to 6) means a k-th surface among the first to sixth surfaces S11 to S16 which are free-form surfaces. As shown in FIG. 11, in this example, it is assumed that the light guide member 10 has the sixth surface S16 which is continuously adjacent to the fourth surface S14. As shown in the drawing, the sixth surface S16 is a light incidence surface, and has a function relating to convergence of a light beam flux. The fourth surface S14 has a function of bending the optical path. That is, in Example 2, the functions in the fourth surface S14 of Example 1 are separated to the fourth surface S14 and the sixth surface S16.

TABLE 7

| m | n | FFS1 | FFS2 | FFS3 | FFS4 | FFS5 | FFS6 |
|---|---|---|---|---|---|---|---|
| 2 | 0 | −4.110E−03 | −1.005E−02 | −3.798E−03 | −3.374E−03 | −2.584E−03 | 3.105E−02 |
| 0 | 2 | −6.261E−03 | −1.022E−02 | −5.949E−03 | −2.723E−02 | 5.720E−03 | 3.039E−02 |
| 3 | 0 | 1.513E−05 | 8.269E−06 | 1.513E−05 | 4.878E−05 | 5.891E−06 | 5.084E−05 |
| 1 | 2 | −8.802E−06 | −4.719E−05 | −8.802E−06 | 1.315E−03 | 1.092E−04 | −4.205E−04 |
| 4 | 0 | −3.283E−07 | −2.484E−06 | −3.283E−07 | 1.997E−05 | 8.630E−06 | 3.586E−05 |
| 2 | 2 | 1.110E−05 | −2.325E−07 | 1.110E−05 | 5.553E−05 | 1.338E−05 | −7.045E−05 |
| 0 | 4 | −1.231E−05 | −3.745E−06 | −1.231E−05 | 1.172E−04 | 4.272E−06 | −6.522E−05 |
| 5 | 0 | −7.697E−08 | 7.994E−08 | −7.697E−08 | −7.495E−07 | 3.889E−07 | 1.241E−05 |
| 3 | 2 | −1.577E−06 | −5.251E−08 | −1.577E−06 | −1.319E−05 | −6.510E−07 | 5.310E−06 |
| 1 | 4 | −1.721E−07 | 6.772E−08 | −1.721E−07 | −2.496E−05 | −1.061E−06 | −1.205E−06 |
| 6 | 0 | 1.800E−09 | 2.414E−09 | 1.800E−09 | −1.502E−07 | 1.016E−09 | 1.206E−06 |
| 4 | 2 | 1.544E−08 | 3.116E−08 | 1.544E−08 | −1.443E−07 | 2.158E−09 | 3.052E−06 |
| 2 | 4 | 2.672E−08 | 7.908E−09 | 2.672E−08 | 1.848E−06 | 7.531E−08 | 2.561E−06 |
| 0 | 6 | 3.158E−07 | 9.774E−10 | 3.158E−07 | 3.779E−06 | 1.021E−07 | 9.437E−07 |

Coefficients of an aspheric surface of the optical surface constituting the projection lens in the projection see-through device of Example 2 are shown in Table 8.

TABLE 8

| | ASP1 | ASP2 | ASP3 | ASP4 | ASP5 | ASP6 |
|---|---|---|---|---|---|---|
| K | 0 | 0 | 0 | 0 | 0 | 0 |
| B4 | −2.343E−05 | −2.140E−03 | −6.380E−04 | −1.244E−04 | 2.638E−04 | 1.289E−04 |
| B6 | 1.019E−06 | −6.197E−06 | −1.496E−05 | −6.791E−06 | 7.578E−07 | 9.812E−06 |
| B8 | 5.340E−08 | −9.118E−08 | −1.696E−07 | −2.134E−08 | 1.763E−08 | −1.069E−07 |

In Table 8, symbols K and Bi represent coefficients which specify aspheric surfaces of aspheric surfaces APS1 to APS6 which are lens surfaces of three lenses 31, 32, 33 constituting the projection lens 30.

FIG. 11 is a sectional view of the projection see-through device 70 of Example 2. In the projection see-through device 70, the light guide member 10 includes the first surface S11 having weak negative refractive power, the second surface S12 having comparatively strong positive refractive power, the third surface S13 having comparatively weak positive refractive power, the fourth surface S14 having comparatively weak negative refractive power, the fifth surface S15 having comparatively weak positive refractive power, and the sixth surface S16 having comparatively strong positive refractive power. The projection lens 30 includes the first lens 31 having positive refractive power, the second lens 32 having negative refractive power, and the third lens 33 having positive refractive power. A specific specification of the optical system of Example 2 is as follows. A horizontal viewing angle is 20.1°, a vertical viewing angle is 11.4°, the size of a display area of the video display element is 9.22×5.18 mm, a pupil diameter is 5 mm, and a focal distance is about 26 mm.

Figure 12A:
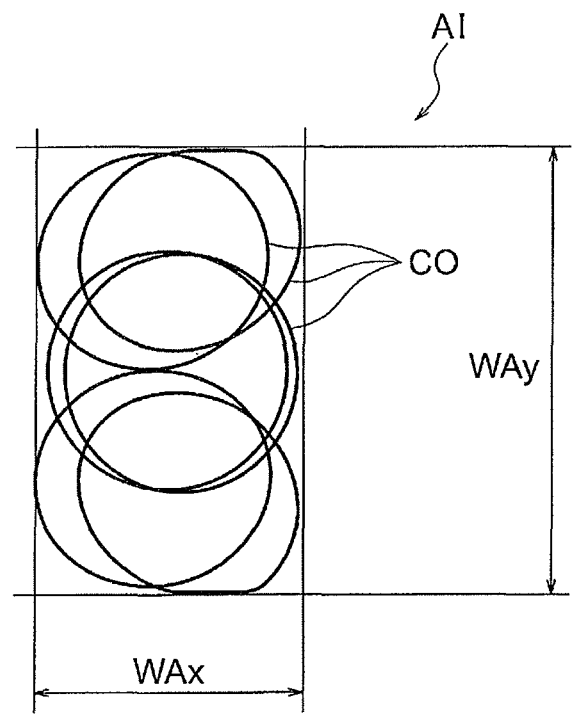
FIG. 12A is a diagram showing a light beam flux cross-sectional shape at a first surface position of Example 2.
Figure 12B:
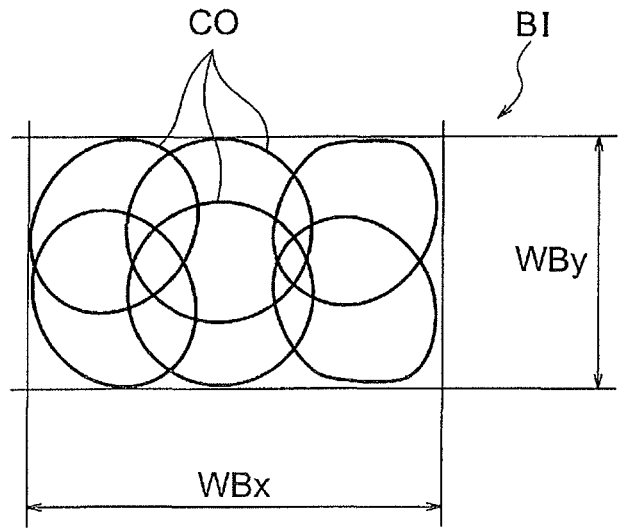
FIG. 12B is a diagram showing a light beam flux cross-sectional shape at a second surface position of Example 2.

FIG. 12A is a diagram showing the shape of a light beam flux cross-section AI at the first surface position A of Example 2, and FIG. 12B is a diagram showing the shape of a light beam flux cross-section BI at the second surface position B of Example 2. As shown in the drawing, the shape of the light beam flux cross-section AI becomes a vertically long shape which satisfies Expression (1), and the shape of the light beam flux cross-section BI becomes a laterally long shape which satisfies Expression (2). In the drawing, one circular contour CO of a plurality of circular contours CO which constitute a light beam flux cross-section represents the outer edge of the light beam flux cross-section over a component of light corresponding to one pixel.

Figure 13A:
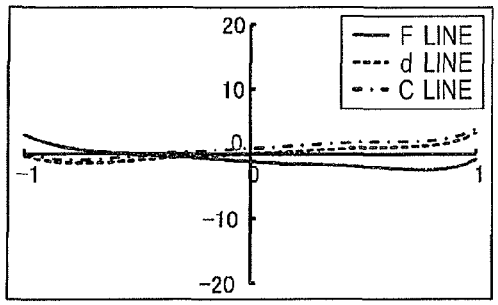
FIGS. 13A, 13B, 13C, 13D, 13E, and 13F are diagrams illustrating aberration of the optical system of Example 2.
Figure 13D:
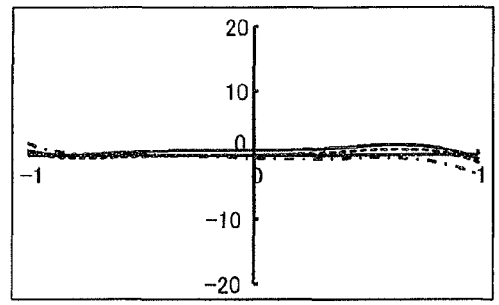
Figure 13B:
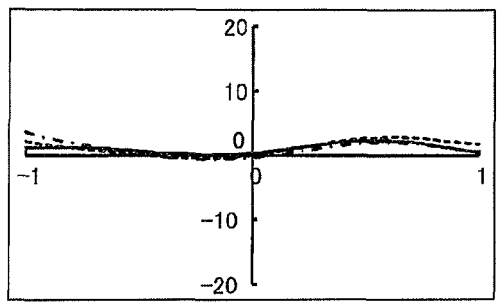
Figure 13E:
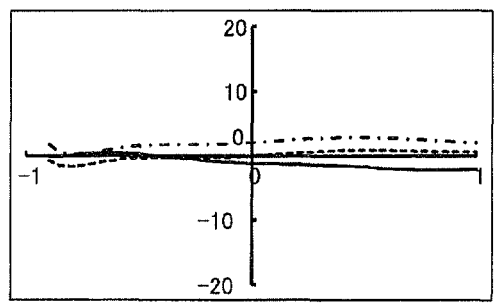
Figure 13C:
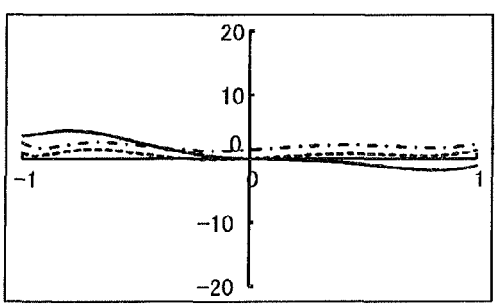
Figure 13F:
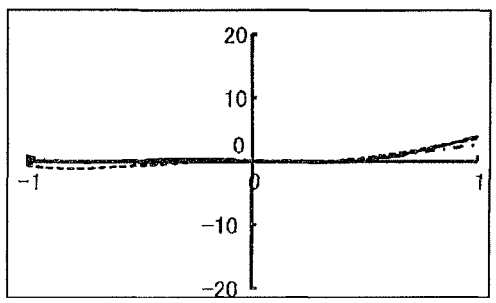
Figure 14A:
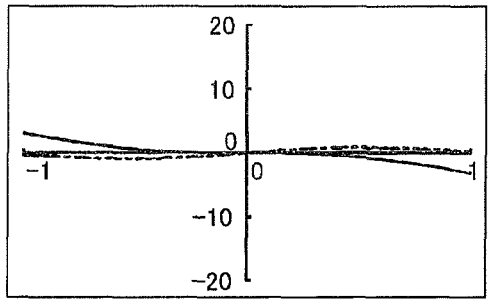
FIGS. 14A, 14B, 14C, 14D, 14E, and 14F are diagrams illustrating aberration of the optical system of Example 2.
Figure 14D:
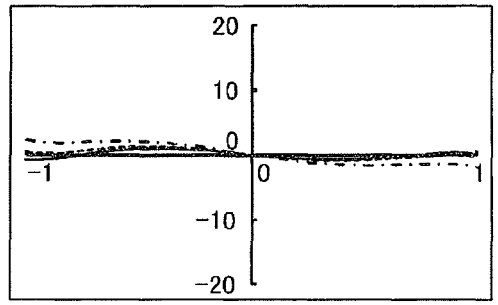
Figure 14B:
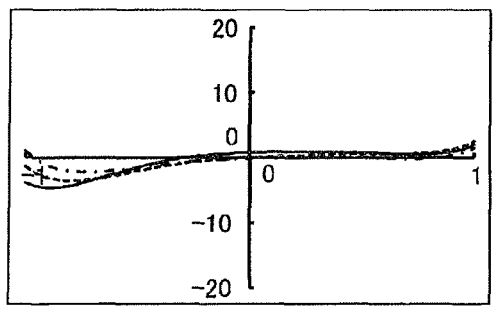
Figure 14E:
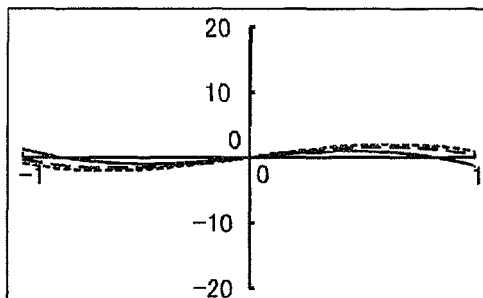
Figure 14C:
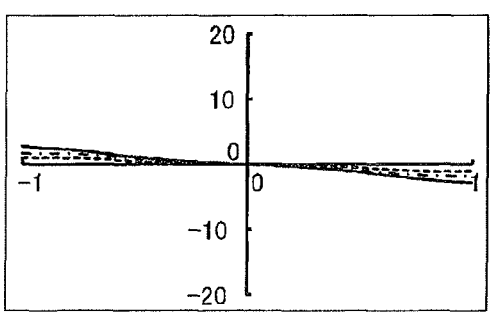
Figure 14F:
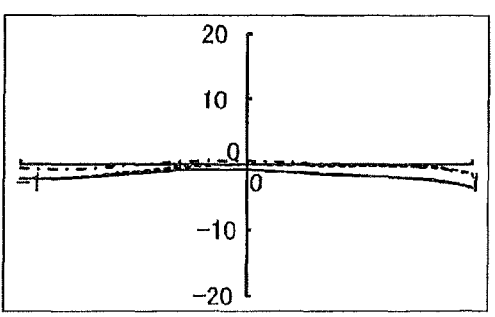

FIGS. 13A to 13F and 14A to 14F show aberration of Example 2. Specifically, FIGS. 13A and 13B show aberration in the Y and X directions at an azimuth of 10° in the X direction and 5.7° in the Y direction, FIGS. 13C and 13D show aberration in the Y and X directions at an azimuth of 0.0° in the X direction and 5.7° in the Y direction, and FIGS. 13E and 13F show aberration in the Y and X directions at an azimuth of −10° in the X direction and 5.7° in the Y direction. FIGS. 14A and 14B show aberration in the Y and X directions at an azimuth of 10° in the X direction and 0.0° in the Y direction, FIGS. 14C and 14D show aberration in the Y and X directions at an azimuth of 0.0° in the X direction and 0.0° in the Y direction, and FIGS. 14E and 14F show aberration in the Y and X directions at an azimuth of −10° in the X direction and 0.0° in the Y direction.

Example 3

In a projection see-through device of Example 3, data on an optical surface constituting a light guide member and a projection lens is shown in Table 9.

TABLE 9

| No | Type | R | T | Nd | Vd |
|----|------|---|---|----|----|
| 1 | SPH | ∞ | 20.00 | | |
| 2 | FFS1 | — | 5.50 | 1.525 | 55.95 |
| 3 | FFS2 | — | −5.50 | 1.525 | 55.95 |
| 4 | FFS1 | — | 9.00 | 1.525 | 55.95 |
| 5 | FFS3 | — | −17.00 | 1.525 | 55.95 |
| 6 | FFS4 | — | 7.00 | 1.525 | 55.95 |
| 7 | FFS5 | — | 2.00 | 1.525 | 55.95 |
| 8 | ASP1 | 7.697 | 4.00 | 1.525 | 55.95 |
| 9 | ASP2 | −4.907 | 0.50 | | |
| 10 | ASP3 | −5.158 | 1.50 | 1.585 | 29.90 |
| 11 | ASP4 | 5.276 | 2.84 | | |
| 12 | ASP5 | 6.501 | 6.00 | 1.525 | 55.95 |
| 13 | ASP6 | −10.192 | 9.51 | | |
| 14 | SPH | ∞ | 1.60 | 1.458 | 67.82 |
| 15 | image surface | | | | |

In regard to the optical surface in the light guide member constituting Example 3, the optical axis inclination angle (tilt) TLY on the cross section and the optical axis deviation (decenter) DCX are shown in Table 10.

TABLE 10

| No | Type | TLY (before surface) | DCX (after surface) | TLY (after surface) |
|----|------|----------------------|---------------------|---------------------|
| 2 | FFS1 | 0 | 0 | 0 |
| 3 | FFS2 | −26 | 0 | 26 |
| 4 | FFS1 | 0 | 0 | 0 |
| 5 | FFS3 | 0 | 19.893504 | −29.394622 |
| 6 | FFS4 | 60 | 0 | 60 |
| 7 | FFS5 | 0 | 0 | 0 |

In regard to each optical surface in the light guide member constituting Example 3, the coefficient expanded as a polynomial of a free-form surface is shown in Table 11. In Table 11, symbols m and n mean variables or degrees in the coefficient $Ak_{m,n}$. A symbol FFSk (where k=1 to 5) means a k-th surface among the first to fifth surfaces S11 to S15 which are free-form surfaces.

TABLE 11

| m | n | FFS1 | FFS2 | FFS3 | FFS4 | FFS5 |
|---|---|------|------|------|------|------|
| 2 | 0 | −1.254E−02 | −1.211E−02 | −1.191E−02 | −2.323E−03 | −7.675E−02 |
| 0 | 2 | −1.031E−02 | −1.364E−02 | −9.899E−03 | 4.233E−04 | −6.169E−02 |
| 3 | 0 | 5.751E−04 | 1.604E−04 | 5.751E−04 | −3.570E−04 | −1.002E−03 |
| 1 | 2 | 2.984E−05 | 7.274E−05 | 2.984E−05 | 5.402E−04 | 1.477E−03 |
| 4 | 0 | −1.456E−05 | −1.762E−05 | −1.456E−05 | 1.163E−04 | −1.143E−03 |
| 2 | 2 | 3.029E−05 | 1.938E−06 | 3.029E−05 | −1.986E−04 | −3.046E−03 |
| 0 | 4 | 5.757E−06 | 3.553E−06 | 5.757E−06 | 2.752E−04 | −1.033E−03 |
| 5 | 0 | −2.015E−07 | 1.015E−06 | −2.015E−07 | 4.365E−08 | 8.729E−05 |
| 3 | 2 | −2.008E−06 | −5.253E−07 | −2.008E−06 | 6.700E−06 | −1.739E−05 |
| 1 | 4 | 2.748E−06 | 6.960E−07 | 2.748E−06 | −6.458E−05 | −2.971E−05 |
| 6 | 0 | 6.781E−09 | −3.238E−08 | 6.781E−09 | −1.541E−06 | 7.581E−05 |
| 4 | 2 | 7.881E−08 | 4.590E−08 | 7.881E−08 | 8.640E−07 | 2.208E−04 |

TABLE 11-continued

| m | n | FFS1 | FFS2 | FFS3 | FFS4 | FFS5 |
|---|---|------|------|------|------|------|
| 2 | 4 | −1.309E−07 | −6.944E−08 | −1.309E−07 | 2.069E−05 | 2.278E−04 |
| 0 | 6 | −4.681E−07 | −1.134E−07 | −4.681E−07 | −2.282E−06 | 6.185E−05 |

Coefficients of an aspheric surface of the optical surface constituting the projection lens in the projection see-through device of Example 3 are shown in Table 12.

TABLE 12

|    | ASP1 | ASP2 | ASP3 | ASP4 | ASP5 | ASP6 |
|----|------|------|------|------|------|------|
| K  | 0 | 0 | 0 | 0 | 0 | 0 |
| B4 | −2.434E−03 | 2.595E−03 | 2.499E−03 | −5.821E−03 | −1.978E−03 | 2.139E−04 |
| B6 | 3.219E−05 | −4.997E−05 | 7.246E−05 | 2.617E−04 | 1.853E−05 | −5.137E−06 |
| B8 | 2.641E−06 | 5.850E−06 | −1.484E−06 | −8.002E−06 | −6.175E−07 | −1.059E−07 |

In Table 12, symbols K and Bi represent coefficients for specifying aspheric surfaces of aspheric surfaces APS1 to APS6 which are lens surfaces of three lenses 31, 32, 33 constituting the projection lens 30.

Figure 15:
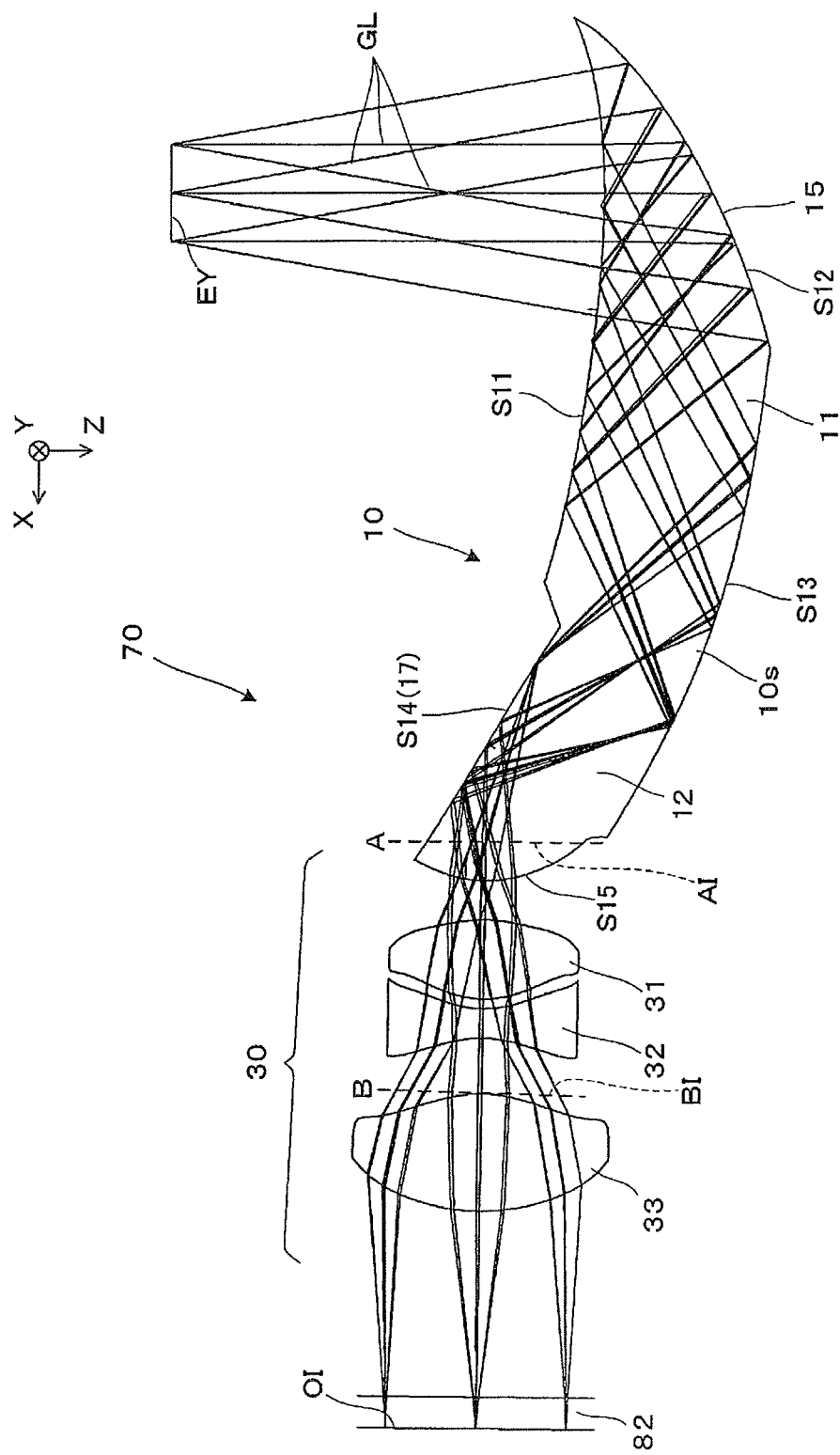
FIG. 15 is a diagram illustrating an optical system of Example 3.

FIG. 15 is a sectional view of the projection see-through device 70 of Example 3. In the projection see-through device 70, the light guide member 10 includes the first surface S11 having weak negative refractive power, the second surface S12 having comparatively strong positive refractive power, the third surface S13 having comparatively weak positive refractive power, the fourth surface S14 having comparatively weak negative refractive power, and the fifth surface S15 having comparatively strong positive refractive power. Here, the fifth surface S15 has the function (the function of the sixth surface S16 of Example 2) of a part of the fourth surface S14 of Example 1 relating to convergence of a light beam flux. That is, Example 3 of FIG. 15 may be considered as a case where the fifth surface S15 among the first to fifth surfaces S11 to S15 of Example 1 shown in FIG. 7 is omitted. The projection lens 30 has the first lens 31 having positive refractive power, the second lens 32 having negative refractive power, and the third lens 33 having positive refractive power. A specific specification of the optical system of Example 3 is as follows. A horizontal viewing angle is 20.1°, a vertical viewing angle is 11.4°, the size of a display area of the video display element is 9.22×5.18 mm, a pupil diameter is 5 mm, and a focal distance is about 26 mm. In this example, the sign of curvature in the x direction and the sign of curvature in the y direction are reversed at the origin of the fourth surface S14.

Figure 16A:
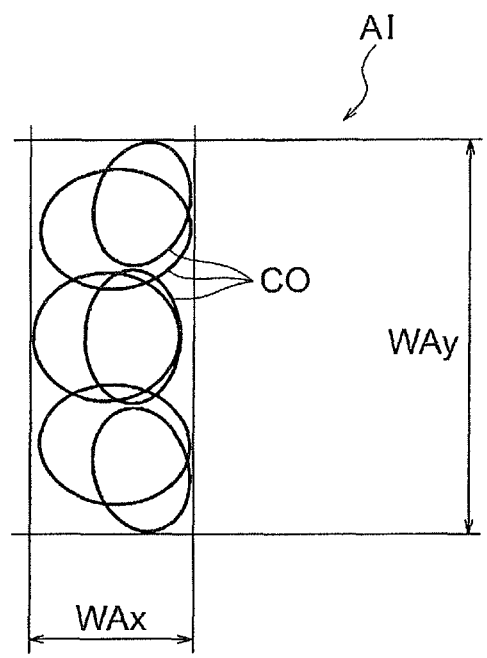
FIG. 16A is a diagram showing a light beam flux cross-sectional shape at a first surface position of Example 3.
Figure 16B:
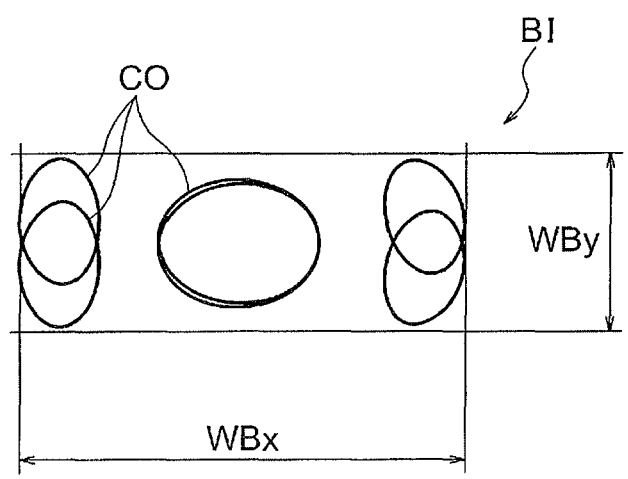
FIG. 16B is a diagram showing a light beam flux cross-sectional shape at a second surface position of Example 3.

FIG. 16A is a diagram showing the shape of a light beam flux cross-section AI at the first surface position A of Example 3, and FIG. 16B is a diagram showing the shape of a light beam flux cross-section BI at the second surface position B of Example 3. As shown in the drawing, the shape of the light beam flux cross-section AI becomes a vertically long shape which satisfies Expression (1), and the shape of the light beam flux cross-section BI becomes a laterally long shape which satisfies Expression (2).

Figure 17A:
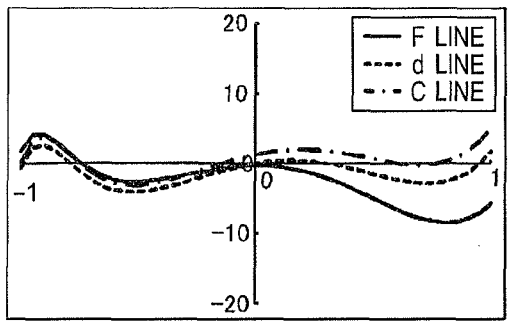
FIGS. 17A, 17B, 17C, 17D, 17E, and 17F are diagrams illustrating aberration of the optical system of Example 3.
Figure 17D:
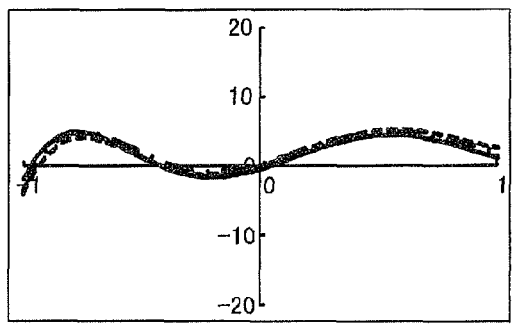
Figure 17B:
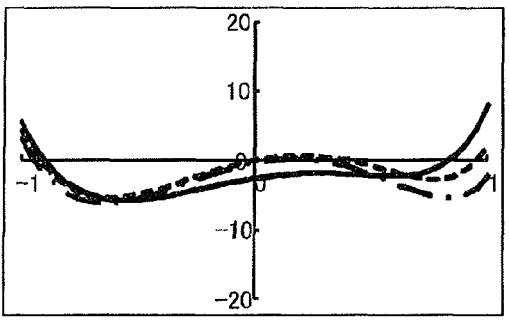
Figure 17E:
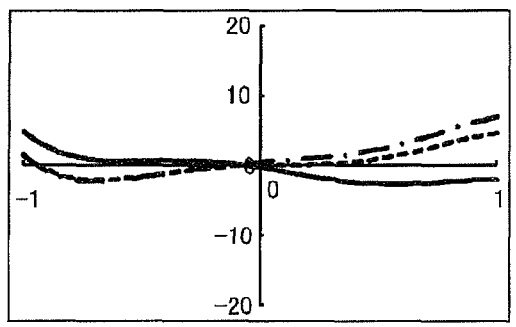
Figure 17C:
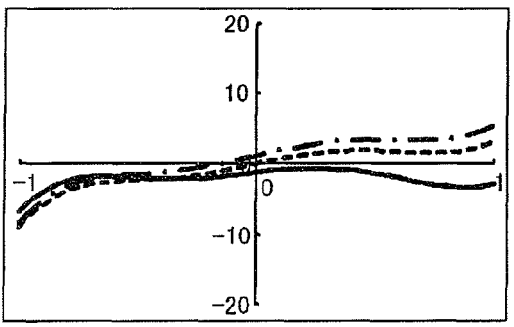
Figure 17F:
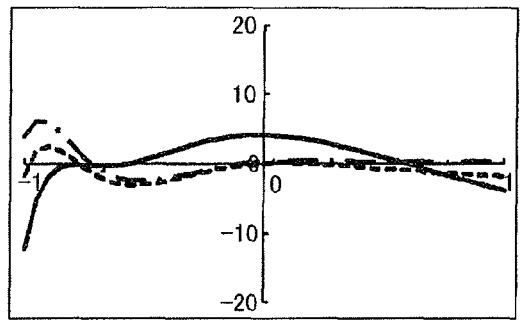
Figure 18A:
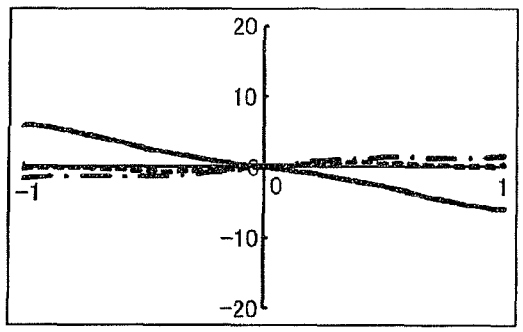
FIGS. 18A, 18B, 18C, 18D, 18E, and 18F are diagrams illustrating aberration of the optical system of Example 3.
Figure 18D:
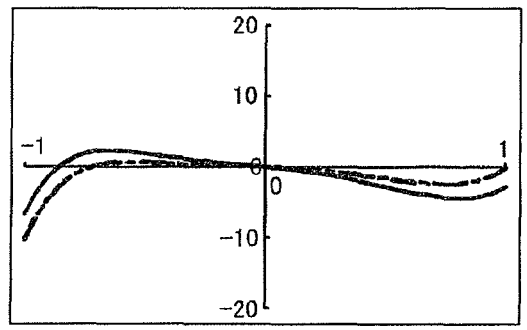
Figure 18B:
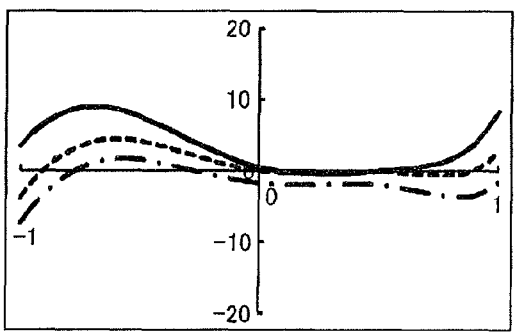
Figure 18E:
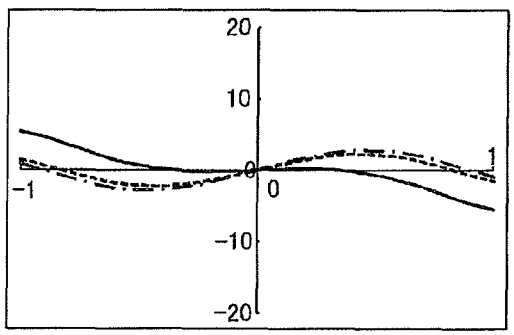
Figure 18C:
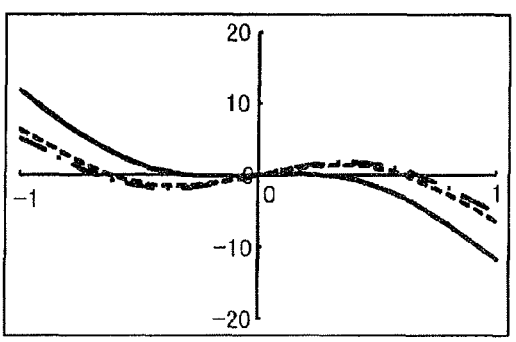
Figure 18F:
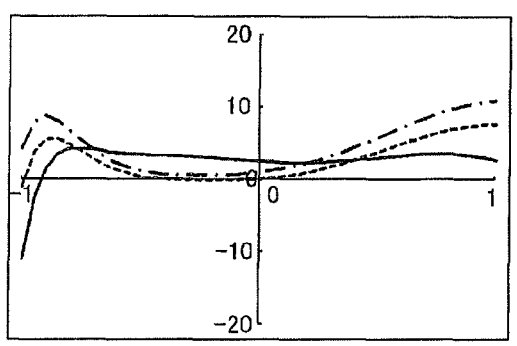

FIGS. 17A to 17F and 18A to 18F show aberration of Example 3. Specifically, FIGS. 17A and 17B show aberration in the Y and X directions at an azimuth of 10° in the X direction and 5.7° in the Y direction, FIGS. 17C and 17D show aberration in the Y and X directions at an azimuth of 0.0° in the X direction and 5.7° in the Y direction, and FIGS. 17E and 17F show aberration in the Y and X directions at an azimuth of −10° in the X direction and 5.7° in the Y direction. FIGS. 18A and 18B show aberration in the Y and X directions at an azimuth of 10° in the X direction and 0.0° in the Y direction, FIGS. 18C and 18D show aberration in the Y and X directions at an azimuth of 0.0° in the X direction and 0.0° in the Y direction, and FIGS. 18E and 18F show aberration in the Y and X directions at an azimuth of −10° in the X direction and 0.0° in the Y direction.

Example 4

In a projection see-through device of Example 4, data on an optical surface constituting a light guide member and a projection lens is shown in Table 13.

TABLE 13

| No | Type | R | T | Nd | Vd |
|----|------|---|---|-----|-----|
| 1  | SPH | ∞ | 20.00 | | |
| 2  | flat surface | ∞ | 5.80 | 1.525 | 55.95 |
| 3  | FFS1 | — | −5.80 | 1.525 | 55.95 |
| 4  | flat surface | ∞ | 10.00 | 1.525 | 55.95 |
| 5  | flat surface | ∞ | −22.70 | 1.525 | 55.95 |
| 6  | FFS2 | — | 11.90 | 1.525 | 55.95 |
| 7  | FFS3 | — | −11.90 | 1.525 | 55.95 |
| 8  | FFS2 | — | −3.20 | | |
| 9  | FFS4 | — | −6.00 | 1.525 | 55.95 |
| 10 | ASP1 | 11.067 | −1.29 | | |
| 11 | ASP2 | 9.431 | −1.50 | 1.585 | 29.90 |
| 12 | ASP3 | −61.649 | −6.75 | | |
| 13 | ASP4 | −16.964 | −5.50 | 1.525 | 55.95 |
| 14 | ASP5 | 12.848 | −3.00 | | |
| 15 | SPH | ∞ | −1.60 | 1.458 | 67.82 |
| 16 | image surface | | | | |

In regard to the optical surface in the light guide member constituting Example 4, the optical axis inclination angle (tilt) TLY on the cross section and the optical axis deviation (decenter) DCX are shown in Table 14.

TABLE 14

| No | Type | TLY (before surface) | DCX (after surface) | TLY (after surface) |
|----|------|----------------------|---------------------|---------------------|
| 2 | flat surface | 6 | 0 | −6 |
| 3 | FFS1 | −23.8 | 0 | 23.8 |
| 4 | flat surface | 6 | 0 | −6 |

TABLE 14-continued

| No | Type | TLY (before surface) | DCX (after surface) | TLY (after surface) |
|----|------|---------------------|---------------------|---------------------|
| 5 | flat surface | 6 | 21.1 | −55.25 |
| 6 | FFS2 | 57 | 0 | 57 |
| 7 | FFS3 | −33.06 | 0 | 33.06 |
| 8 | FFS2 | −57 | 11.04 | −11.75 |

In regard to each optical surface in the light guide member constituting Example 4, the coefficient expanded as a polynomial of a free-form surface is shown in Table 15. Among the first to fifth surfaces S11 to S15, the first surface S11 and the third surface S13 are flat surfaces and are in parallel with each other. A lens surface 31a (see FIG. 19) of the first lens 31 among the lenses constituting the projection lens 30 is an aspheric surface (non-axisymmetric aspheric surface) asymmetrical to the optical axis. In Table 15, symbols m and n mean variables or degrees in the coefficient $Ak_{m,n}$. A symbol FFSk (where k=1 to 4) means the second surface S12, the fourth surface S14, and the fifth surface S15 which are free-form surfaces, not flat surfaces, among the first to fifth surfaces S11 to S15, and the lens surface 31a of the first lens 31. That is, a symbol FFS1 corresponds to the second surface S12, a symbol FFS2 corresponds to the fourth surface S14, a symbol FFS3 corresponds to the fifth surface S15, and a symbol FFS4 corresponds to the lens surface 31a.

TABLE 15

| m | n | FFS1 | FFS2 | FFS3 | FFS4 |
|---|---|------|------|------|------|
| 2 | 0 | −8.000E−03 | 1.281E−03 | −1.232E−02 | 3.377E−02 |
| 0 | 2 | −7.104E−03 | −2.261E−02 | −1.810E−02 | −5.713E−02 |
| 3 | 0 | −7.472E−06 | 1.253E−03 | 5.624E−06 | 4.621E−03 |
| 1 | 2 | −3.912E−05 | 4.613E−04 | −9.222E−06 | 1.954E−03 |
| 4 | 0 | 7.734E−07 | −1.083E−06 | 5.367E−06 | −1.747E−04 |
| 2 | 2 | 1.827E−07 | −2.670E−06 | 1.341E−05 | 5.794E−05 |
| 0 | 4 | −3.075E−07 | 1.216E−06 | 9.966E−07 | 5.078E−05 |
| 5 | 0 | −2.648E−08 | 5.502E−08 | 5.965E−07 | −4.209E−05 |
| 3 | 2 | −4.661E−08 | −1.212E−06 | 7.145E−07 | −1.351E−05 |
| 1 | 4 | −7.936E−09 | −7.680E−06 | 5.860E−07 | −5.436E−06 |
| 6 | 0 | −5.229E−09 | 2.269E−08 | 2.790E−08 | 2.173E−06 |
| 4 | 2 | −1.021E−08 | 3.050E−08 | 3.560E−08 | 3.457E−06 |
| 2 | 4 | −4.325E−09 | 3.383E−07 | 3.763E−08 | 3.162E−06 |
| 0 | 6 | 1.946E−09 | 1.015E−07 | 9.005E−08 | 2.207E−06 |

Coefficients of an aspheric surface of the optical surface constituting the projection lens in the projection see-through device of Example 4 are shown in Table 16.

TABLE 16

|    | ASP1 | ASP2 | ASP3 | ASP4 | ASP5 |
|----|------|------|------|------|------|
| K  | −1 | −1 | −1 | −1 | −1 |
| B4 | −2.302E−04 | −1.562E−03 | −1.273E−03 | 1.885E−04 | 3.482E−04 |
| B6 | −4.106E−06 | 6.061E−06 | −4.546E−06 | 3.211E−06 | 4.031E−07 |
| B8 | 1.065E−07 | 1.246E−07 | −1.173E−07 | 3.480E−08 | 2.487E−08 |

In Table 16, symbols K and Bi represent coefficients for specifying aspheric surfaces of aspheric surfaces APS1 to APS5 which are lens surfaces excluding the first lens surface 31a of the lens 31, that is, the surface of the symbol FFS4 among the lens surfaces of the three lenses 31, 32, and 33 constituting the projection lens 30.

Figure 19:
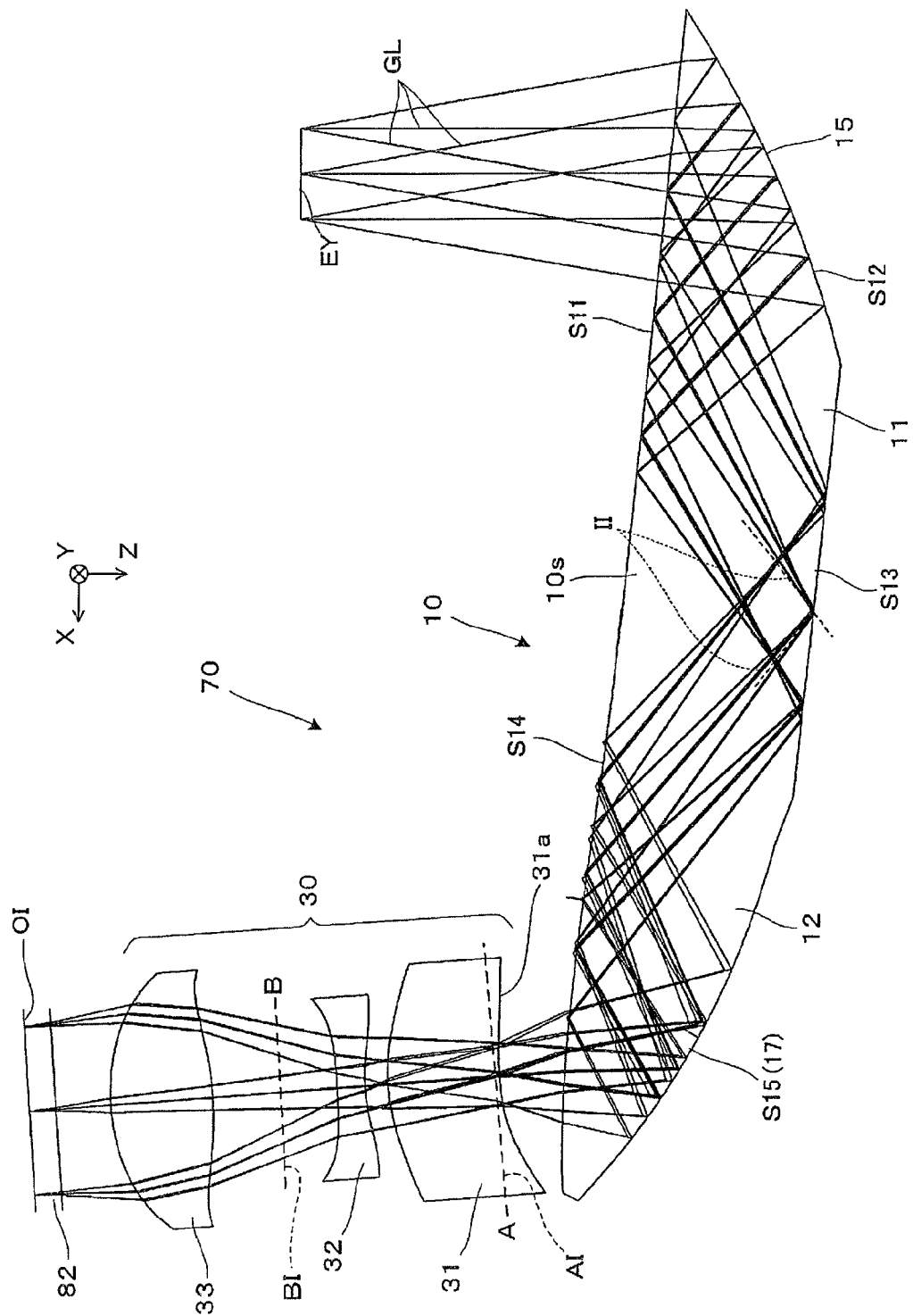
FIG. 19 is a diagram illustrating an optical system of Example 4.

FIG. 19 is a sectional view of the projection see-through device 70 of Example 4. In the projection see-through device 70, the light guide member 10 includes the first surface S11 having no refractive power, the second surface S12 having comparatively strong positive refractive power, the third surface S13 having no refractive power, the fourth surface S14 having comparatively weak positive refractive power, and the fifth surface S15 having comparatively strong positive refractive power. The projection lens 30 includes the first lens 31 having positive refractive power, the second lens 32 having negative refractive power, and the third lens 33 having positive refractive power. As described above, the lens surface 31a of the first lens 31 is an aspheric surface (non-axisymmetric aspheric surface) asymmetrical to the optical axis. In this case, in addition to the light guide member 10, a function of correcting non-axisymmetric aberration may be provided in the projection lens 30. A specific specification of the optical system of Example 4 is as follows. A horizontal viewing angle is 20.1°, a vertical viewing angle is 11.4°, the size of a display area of the video display element is 9.22×5.18 mm, a pupil diameter is 5 mm, and a focal distance is about 26 mm. In this case, the first surface S11 and the third surface S13 arranged to face each other have parallel flat shapes, and thus, when the observer views an external scene through the first surface S11 and the third surface S13, diopter can be completely 0.

Figure 20A:
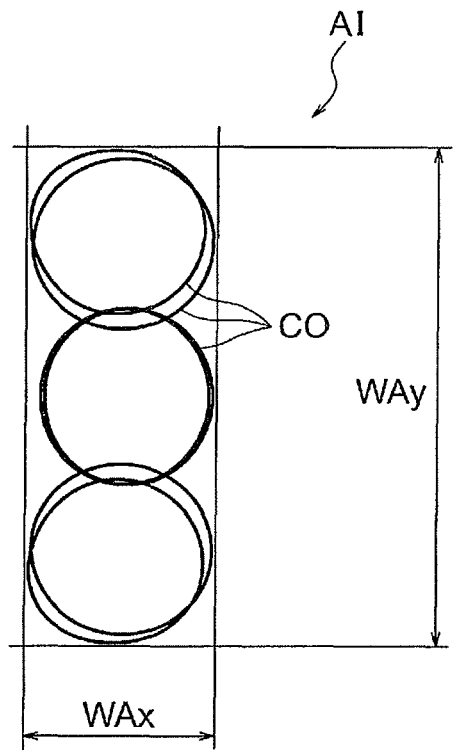
FIG. 20A is a diagram showing a light beam flux cross-sectional shape at a first surface position of Example 4.
Figure 20B:
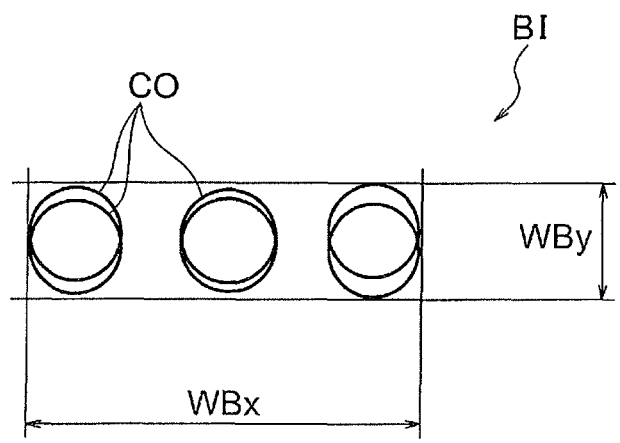
FIG. 20B is a diagram showing a light beam flux cross-sectional shape at a second surface position of Example 4.

FIG. 20A is a diagram showing the shape of a light beam flux cross-section AI at the first surface position A of Example 4, and FIG. 20B is a diagram showing the shape of a light beam flux cross-section BI at the second surface position B of Example 4. As shown in the drawing, the shape of the light beam flux cross-section AI becomes a vertically long shape which satisfies Expression (1), and the shape of the light beam flux cross-section BI becomes a laterally long shape which satisfies Expression (2).

Figure 21A:
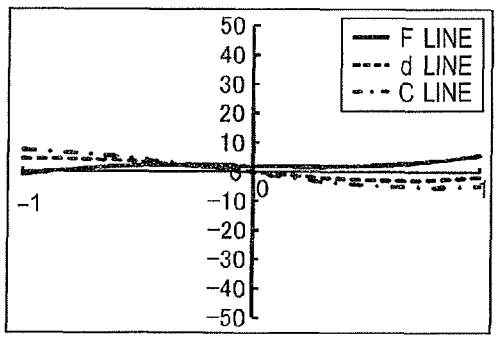
FIGS. 21A, 21B, 21C, 21D, 21E, and 21F are diagrams illustrating aberration of the optical system of Example 4.
Figure 21D:
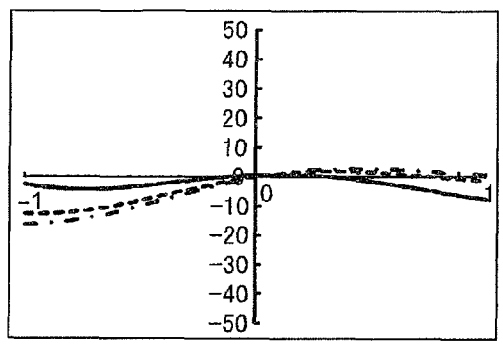
Figure 21B:
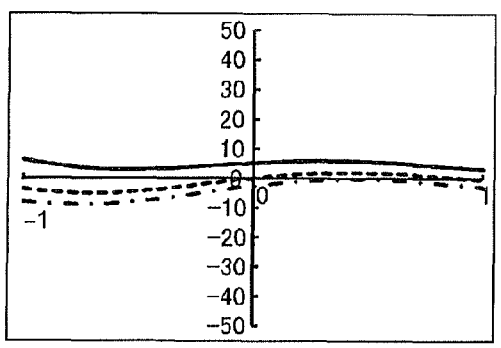
Figure 21E:
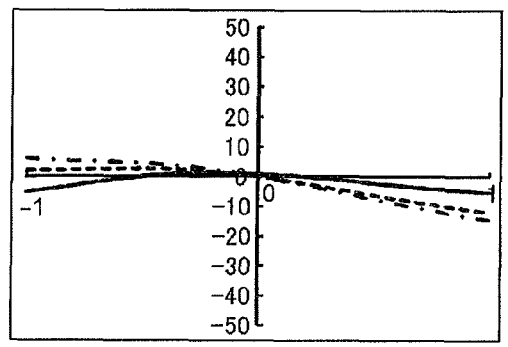
Figure 21C:
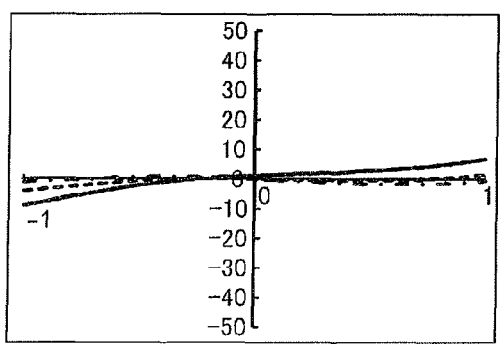
Figure 21F:
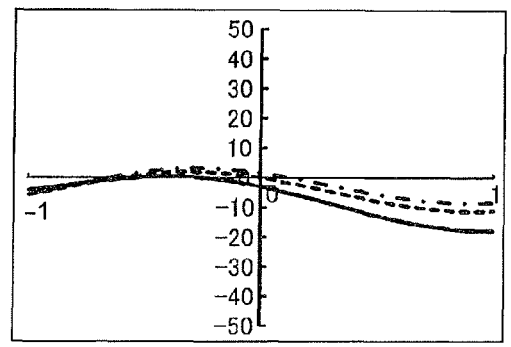
Figure 22A:
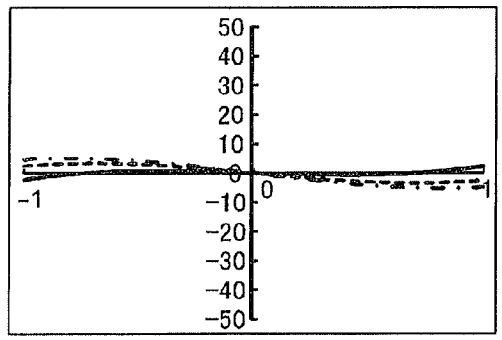
FIGS. 22A, 22B, 22C, 22D, 22E, and 22F are diagrams illustrating aberration of the optical system of Example 4.
Figure 22D:
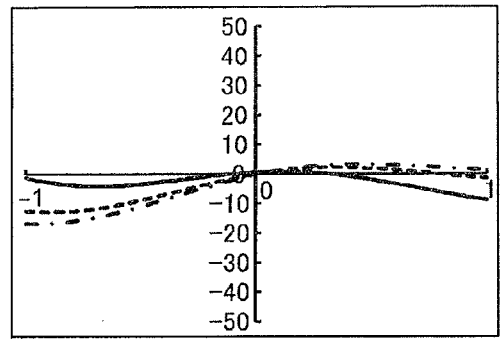
Figure 22B:
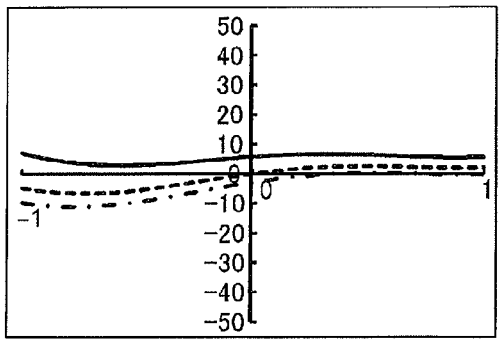
Figure 22E:
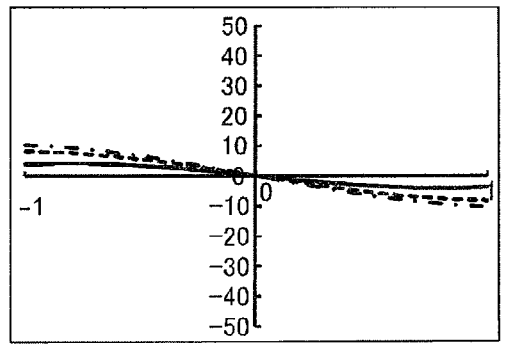
Figure 22C:
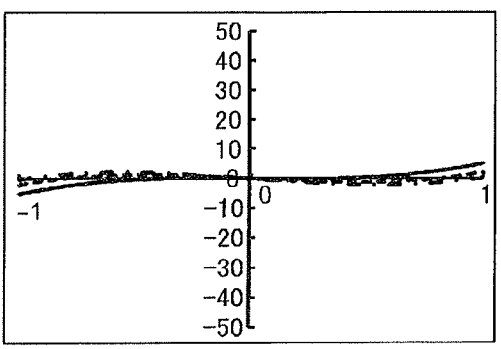
Figure 22F:
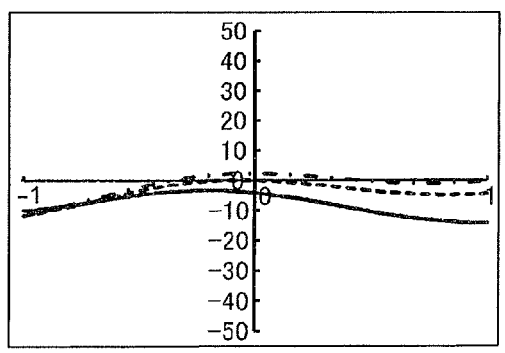

FIGS. 21A to 21F and 22A to 22F show aberration of Example 4. Specifically, FIGS. 21A and 21B show aberration in the Y and X directions at an azimuth of 10° in the X direction and 5.7° in the Y direction, FIGS. 21C and 21D show aberration in the Y and X directions at an azimuth of 0.0° in the X direction and 5.7° in the Y direction, and FIGS. 21E and 21F show aberration in the Y and X directions at an azimuth of −10° in the X direction and 5.7° in the Y direction. FIGS. 22A and 22B show aberration in the Y and X directions at an azimuth of 10° in the X direction and 0.0° in the Y direction, FIGS. 22C and 22D show aberration in the Y and X directions at an azimuth of 0.0° in the X direction and 0.0° in the Y direction, and FIGS. 22E and 22F show aberration in the Y and X directions at an azimuth of −10° in the X direction and 0.0° in the Y direction.

Example 5

In a projection see-through device of Example 5, data on an optical surface constituting a light guide member and a projection lens is shown in Table 17.

TABLE 17

| No | Type | R | T | Nd | Vd |
|---|---|---|---|---|---|
| 1 | SPH | ∞ | 20.00 | | |
| 2 | FFS1 | — | 5.00 | 1.525 | 55.95 |
| 3 | FFS2 | — | −5.00 | 1.525 | 55.95 |
| 4 | FFS1 | — | 8.50 | 1.525 | 55.95 |
| 5 | FFS3 | — | −12.00 | 1.525 | 55.95 |
| 6 | FFS4 | — | 9.00 | 1.525 | 55.95 |
| 7 | FFS5 | — | −6.20 | 1.525 | 55.95 |
| 8 | FFS6 | — | −2.00 | | |
| 9 | ASP1 | −46.932 | −1.50 | 1.585 | 29.90 |
| 10 | FFS7 | — | −3.23 | | |
| 11 | ASP2 | −6.165 | −4.00 | 1.525 | 55.95 |
| 12 | ASP3 | −19.763 | −3.00 | | |
| 13 | SPH | ∞ | −1.44 | 1.458 | 67.82 |
| 14 | image surface | ∞ | | | |

In regard to the optical surface in the light guide member constituting Example 5, the optical axis inclination angle (tilt) TLY on the cross section and the optical axis deviation (decenter) DCX are shown in Table 18.

TABLE 18

| No | Type | TLY (before surface) | DCX (after surface) | TLY (after surface) |
|---|---|---|---|---|
| 2 | FFS1 | 0.00 | 0.0 | 0.00 |
| 3 | FFS2 | −24.00 | 0.0 | 24.00 |
| 4 | FFS1 | 0.00 | 0.0 | 0.00 |
| 5 | FFS3 | 0.00 | 15.361 | −5.87 |
| 6 | FFS4 | 35.00 | 0.0 | 35.00 |
| 7 | FFS5 | −37.00 | 0.0 | −37.00 |
| 8 | FFS6 | 0.00 | 0.0 | 0.00 |

In regard to each optical surface in the light guide member constituting Example 5, the coefficient expanded as a polynomial of a free-form surface is shown in Table 19. In Table 19, symbols m and n mean variables or degrees in the coefficient $Ak_{m,n}$. A symbol FFSk (where k=1 to 6) means a k-th surface among the first to sixth surfaces S11 to S16 which are free-form surfaces. A symbol FFS7 corresponds to a second lens surface (see FIG. 23) which is another lens surface of the first lens 31 among two lenses 31 and 32 constituting the projection lens 30. The lens surface 31b is an aspheric surface asymmetrical to the optical axis. In Tables 13 and 14, symbols m and n mean variables or degrees in the coefficient $Ak_{m,n}$.

TABLE 19

| m | n | FFS1 | FFS2 | FFS3 | FFS4 |
|---|---|---|---|---|---|
| 2 | 0 | −9.590E−03 | −1.493E−02 | −9.015E−03 | 1.106E−02 |
| 0 | 2 | −3.895E−02 | −1.718E−02 | −3.174E−02 | −4.225E−02 |
| 3 | 0 | −3.944E−05 | 1.514E−04 | −3.155E−05 | −1.006E−03 |
| 1 | 2 | 7.919E−05 | −5.479E−04 | 6.335E−05 | −1.529E−03 |
| 4 | 0 | 1.802E−05 | −9.117E−06 | −1.873E−05 | 6.325E−05 |
| 2 | 2 | −1.154E−04 | −1.375E−06 | 2.347E−05 | −1.241E−04 |
| 0 | 4 | 2.027E−06 | −8.306E−06 | −3.121E−05 | 3.387E−04 |
| 5 | 0 | −1.163E−06 | 6.691E−07 | 1.423E−07 | 1.841E−05 |
| 3 | 2 | 3.615E−07 | −9.426E−07 | −3.074E−06 | 7.113E−06 |
| 1 | 4 | −8.107E−06 | −3.125E−07 | 2.872E−06 | 8.646E−05 |
| 6 | 0 | 5.687E−08 | −1.366E−08 | 6.812E−09 | −5.296E−06 |
| 4 | 2 | −8.370E−08 | 2.463E−08 | 1.030E−08 | −1.413E−07 |
| 2 | 4 | −5.216E−07 | −2.612E−08 | −2.164E−07 | 1.999E−05 |
| 0 | 6 | 4.183E−08 | −6.074E−08 | −4.753E−08 | −3.325E−06 |

| m | n | FFS5 | FFS6 | FFS7 |
|---|---|---|---|---|
| 2 | 0 | −2.012E−02 | 4.113E−03 | −4.696E−02 |
| 0 | 2 | −2.602E−02 | 1.450E−01 | 8.928E−02 |

TABLE 19-continued

| 3 | 0 | 1.762E−04 | −6.809E−03 | 1.596E−03 |
|---|---|---|---|---|
| 1 | 2 | 3.957E−04 | 4.988E−03 | 5.628E−03 |
| 4 | 0 | 4.907E−07 | −2.072E−04 | −1.046E−04 |
| 2 | 2 | 1.606E−05 | 7.518E−04 | −2.569E−04 |
| 0 | 4 | 1.968E−04 | −4.126E−03 | 4.836E−03 |
| 5 | 0 | 6.181E−07 | 2.409E−05 | 5.063E−05 |
| 3 | 2 | −2.044E−06 | −2.596E−05 | −2.063E−04 |
| 1 | 4 | 5.215E−06 | 2.987E−04 | −3.074E−04 |
| 6 | 0 | 8.272E−08 | −1.343E−05 | −2.780E−05 |
| 4 | 2 | −2.522E−06 | −3.140E−05 | −1.312E−04 |
| 2 | 4 | 2.747E−05 | 5.979E−05 | −4.072E−04 |
| 0 | 6 | −9.104E−05 | 4.539E−04 | −1.536E−03 |

Coefficients of an aspheric surface of the optical surface constituting the projection lens in the projection see-through device of Example 5 are shown in Table 20.

TABLE 20

| | ASP1 | ASP2 | ASP3 |
|---|---|---|---|
| K | −1 | −1 | −1 |
| B4 | 1.730E−05 | 3.985E−04 | 3.628E−04 |
| B6 | −4.292E−05 | −1.324E−05 | −2.023E−05 |
| B8 | 4.667E−07 | 1.089E−07 | 3.764E−07 |

In Table 20, symbols K and Bi represent coefficients for specifying aspheric surfaces of aspheric surfaces APS1 to APS3 which are lens surfaces excluding the second lens surface 31b of the lens 31, that is, the surface of the symbol FFS7 among the two lenses 31 and 32 constituting the projection lens 30.

Figure 23:
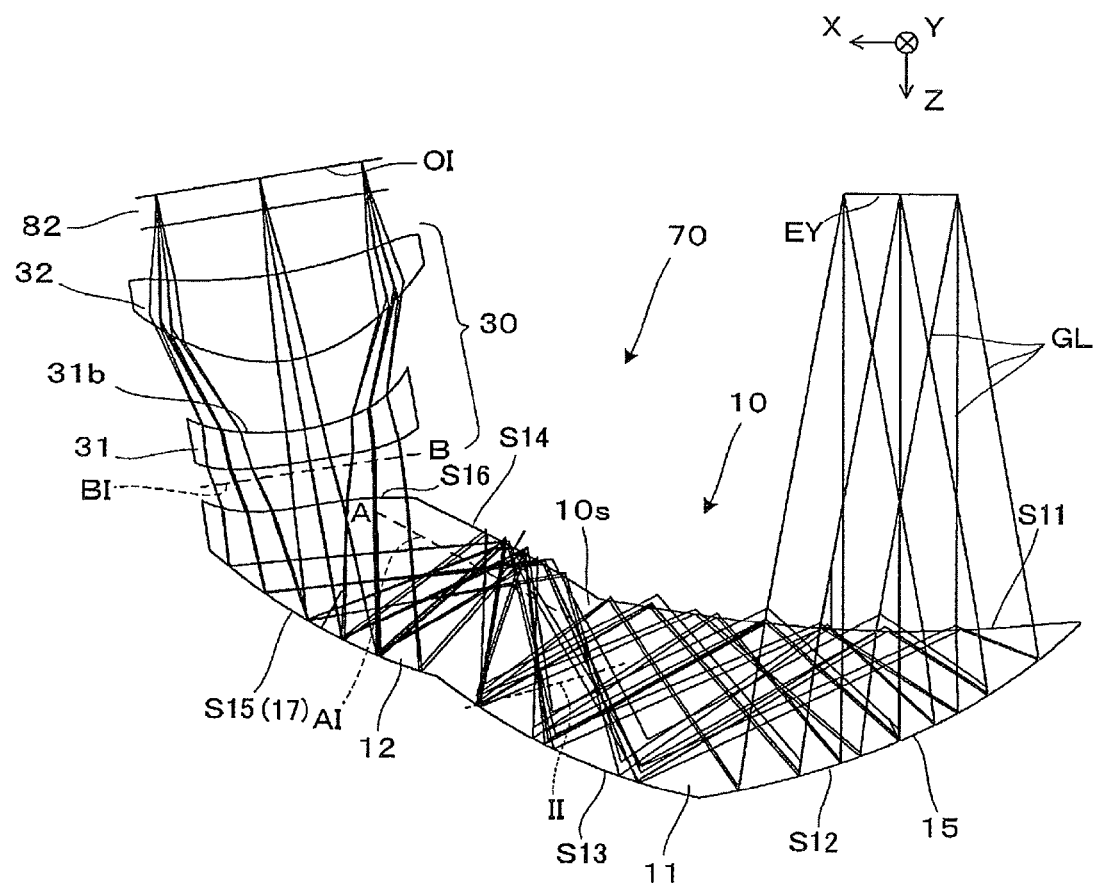
FIG. 23 is a diagram illustrating an optical system of Example 5.

FIG. 23 is a sectional view of the projection see-through device 70 of Example 5. In the projection see-through device 70, the light guide member 10 includes the first surface S11 having weak negative refractive power, the second surface S12 having comparatively strong positive refractive power, the third surface S13 having comparatively weak positive refractive power, the fourth surface S14 having comparatively weak positive refractive power, the fifth surface S15 having comparatively strong positive refractive power, and the sixth surface S16 having comparatively strong positive refractive power. The projection lens 30 includes the first lens 31 having negative refractive power, and the second lens 32 having positive refractive power. A specific specification of the optical system of Example 5 is as follows. A horizontal viewing angle is 20.1°, a vertical viewing angle is 11.4°, the size of a display area of the video display element is 9.22×5.18 mm, a pupil diameter is 5 mm, and a focal distance is about 26 mm. In this example, the sign of curvature in the x direction and the sign of curvature in the y direction are reversed at the origin of the fourth surface S14.

Figure 24A:
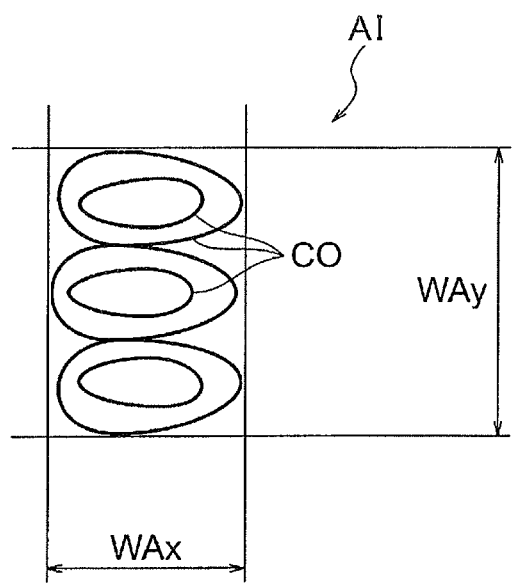
FIG. 24A is a diagram showing a light beam flux cross-sectional shape at a first surface position of Example 5.
Figure 24B:
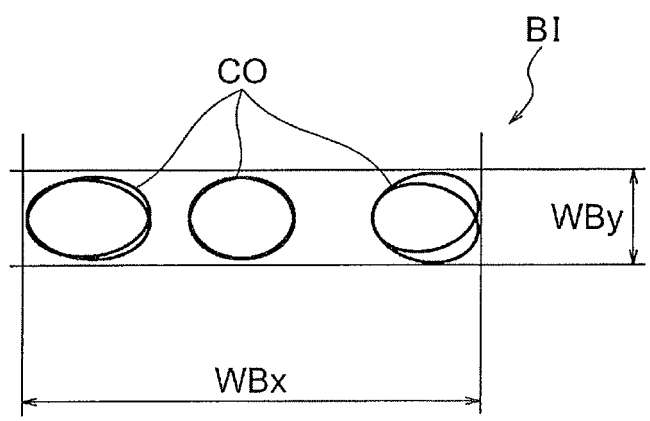
FIG. 24B is a diagram showing a light beam flux cross-sectional shape at a second surface position of Example 5.

FIG. 24A is a diagram showing the shape of a light beam flux cross-section AI at the first surface position A of Example 5, and FIG. 24B is a diagram showing the shape of a light beam flux cross-section BI at the second surface position B of Example 5. As shown in the drawing, the shape of the light beam flux cross-section AI becomes a vertically long shape which satisfies Expression (1), and the shape of the light beam flux cross-section BI becomes a laterally long shape which satisfies Expression (2).

Figure 25A:
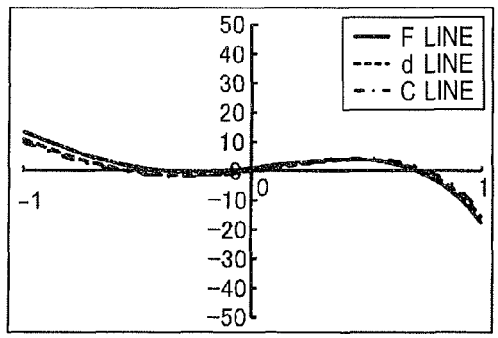
FIGS. 25A, 25B, 25C, 25D, 25E, and 25F are diagrams illustrating aberration of the optical system of Example 5.
Figure 25D:
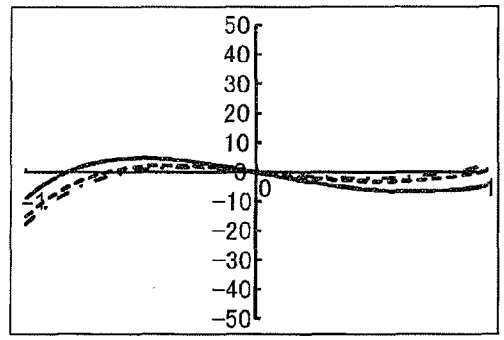
Figure 25B:
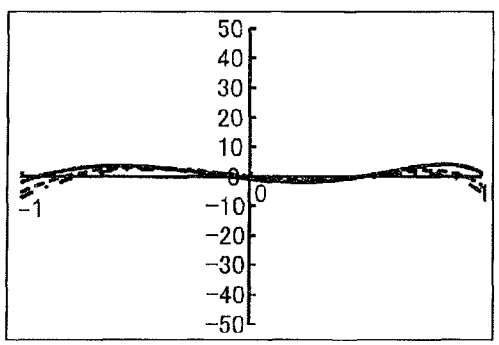
Figure 25E:
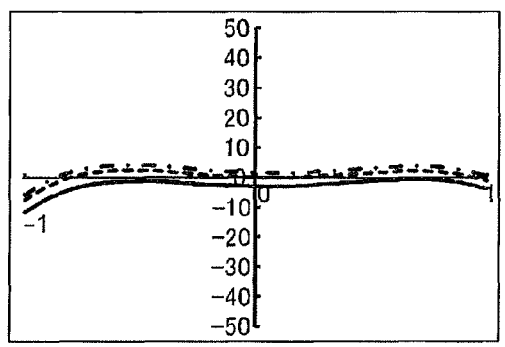
Figure 25C:
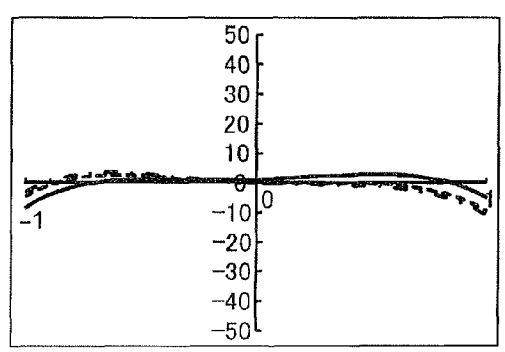
Figure 25F:
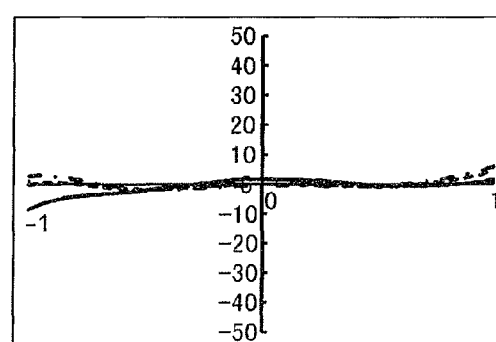

FIGS. 25A to 25F and 26A to 26F show aberration of Example 5. Specifically, FIGS. 25A and 25B show aberration in the Y and X directions at an azimuth of 10° in the X direction and 5.7° in the Y direction, FIGS. 25C and 25D show aberration in the Y and X directions at an azimuth of 0.0° in the X direction and 5.7° in the Y direction, and FIGS.

Figure 26A:
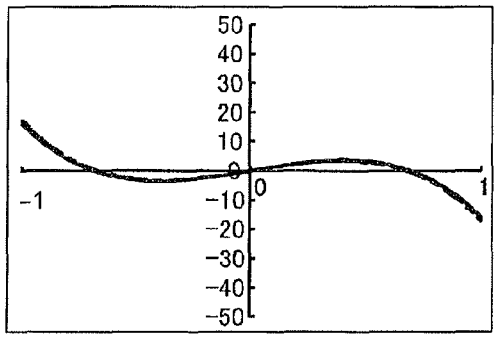
FIGS. 26A, 26B, 26C, 26D, 26E, and 26F are diagrams illustrating aberration of the optical system of Example 5.
Figure 26D:
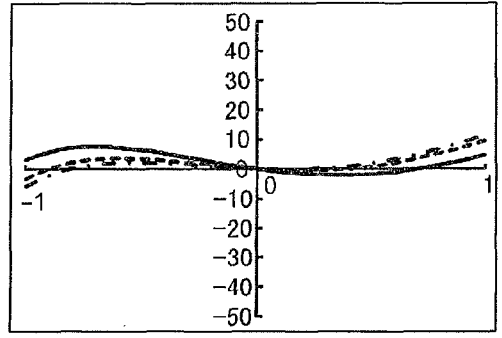
Figure 26B:
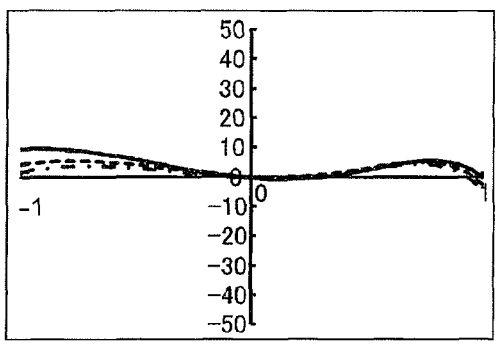
Figure 26E:
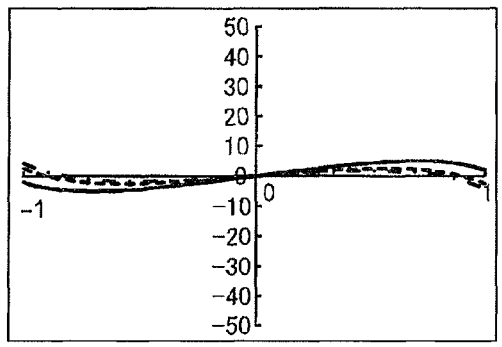
Figure 26C:
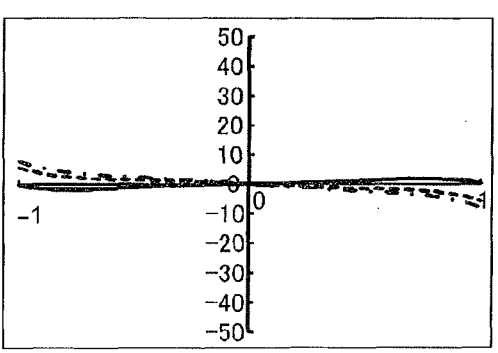
Figure 26F:
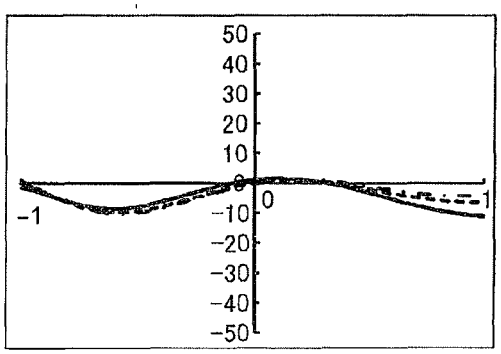

25E and 25F show aberration in the Y and X directions at an azimuth of −10° in the X direction and 5.7° in the Y direction. FIGS. 26A and 26B show aberration in the Y and X directions at an azimuth of 10° in the X direction and 0.0° in the Y direction, FIGS. 26C and 26D show aberration in the Y and X directions at an azimuth of 0.0° in the X direction and 0.0° in the Y direction, FIGS. 26E and 26F show aberration in the Y and X directions at an azimuth of −10° in the X direction and 0.0° in the Y direction.

In regard to Examples 1 to 5, numerical data relating to the conditional expressions (1) to (3) is summarized in Table 21.

TABLE 21

| coefficient value or conditional value | | Example 1 | Example 2 | Example 3 | Example 4 | Example 5 |
|---|---|---|---|---|---|---|
| | $A1_{2,0}$ | −6.070E−03 | −4.110E−03 | −1.254E−02 | 0.000E+00 | −9.590E−03 |
| | $A1_{0,2}$ | −6.428E−03 | −6.261E−03 | −1.031E−02 | 0.000E+00 | −3.895E−02 |
| | $A3_{2,0}$ | −5.518E−03 | −3.798E−03 | −1.191E−02 | 0.000E+00 | −9.015E−03 |
| | $A3_{0,2}$ | −5.843E−03 | −5.949E−03 | −9.899E−03 | 0.000E+00 | −3.174E−02 |
| conditional expression (1) | $A1_{2,0} + A1_{0,2}$ | −1.2E−02 | −1.0E−02 | −2.3E−02 | 0.0E+00 | −4.9E−02 |
| conditional expression (1) | $A3_{2,0} + A3_{0,2}$ | −1.1E−02 | −9.7E−03 | −2.2E−03 | 0.0E+00 | −4.1E−02 |
| conditional expression (2) | $|A1_{2,0} - A1_{0,2}|$ | 3.6E−04 | 2.2E−03 | 2.2E−03 | 0.0E−00 | 2.9E−02 |
| conditional expression (2) | $|A3_{2,0} - A3_{0,2}|$ | 3.3E−04 | 2.2E−03 | 2.0E−03 | 0.0E−00 | 2.3E−02 |
| conditional expression (3) | $|A1_{2,0} - A3_{2,0}|$ | 5.5E−04 | 3.1E−04 | 6.3E−04 | 0.0E−00 | 5.8E−04 |
| conditional expression (3) | $|A1_{0,2} - A3_{0,2}|$ | 5.8E−04 | 3.1E−04 | 4.1E−04 | 0.0E−00 | 7.2E−03 |

In regard to Examples 1 to 5, numerical data relating to the interval between the first surface S11 and the third surface S13 and the inclination angle of the second surface S12 with respect to the first surface S11 is summarized in Table 22.

TABLE 22

| | Example 1 | Example 2 | Example 3 | Example 4 | Example 5 |
|---|---|---|---|---|---|
| interval (mm) between S11 and S13 | 10.00 | 10.00 | 9.00 | 10.00 | 8.50 |
| inclination angle (°) of S12 with respect to S11 | 28 | 29 | 26 | 23.8 | 24 |

The conditional expression (3) affects diopter of the light guide member with respect to external light, and if the thickness of the light guide member is T and the refractive index is N, diopter Dx in the x-axis direction and diopter Dy in the y-axis direction on the optical axis of the light guide member are given by the following expressions.

$$Dx = 2000(N-1)(A1_{2,0} - A3_{2,0} + (2T(N-1)/N) \times A1_{2,0} \times A3_{2,0})$$

$$Dy = 2000(N-1)(A1_{0,2} - A3_{0,2} + (2T(N-1)/N) \times A1_{0,2} \times A3_{0,2})$$

In regard to Examples 1 to 5, numerical data relating to diopter is summarized in Table 23 based on the above-described expressions.

TABLE 23

| | Example 1 | Example 2 | Example 3 | Example 4 | Example 5 |
|---|---|---|---|---|---|
| diopter Dx (D: diopter) | −0.34 | −0.21 | 0.31 | 0.00 | −0.07 |
| diopter Dy (D: diopter) | −0.34 | −0.06 | 0.23 | 0.00 | 0.03 |
| prism thickness T (mm) | 10 | 10 | 9 | 10 | 8.5 |
| refractive index N | 1.525 | 1.525 | 1.525 | 1.525 | 1.525 |

In regard to Examples 1 to 5, numerical data relating to the widths WAx and WAy for the light beam flux cross-section is summarized in Table 24. In all examples, the conditional expressions (1) and (2) and the conditional expressions (4) and (5) are satisfied.

TABLE 24

| | Example 1 | Example 2 | Example 3 | Example 4 | Example 5 |
|---|---|---|---|---|---|
| H | 5.00 | 5.00 | 5.00 | 5.00 | 5.00 |
| WAx | 3.04 | 4.90 | 2.93 | 3.50 | 3.60 |
| WAy | 5.65 | 8.26 | 7.29 | 9.28 | 5.28 |
| ratio | 0.54 | 0.59 | 0.40 | 0.38 | 0.68 |
| WBx | 6.93 | 7.49 | 8.31 | 7.23 | 8.29 |
| WBy | 2.38 | 4.58 | 3.16 | 2.14 | 1.62 |
| ratio | 2.91 | 1.64 | 2.63 | 3.38 | 5.12 |

Figure 27:
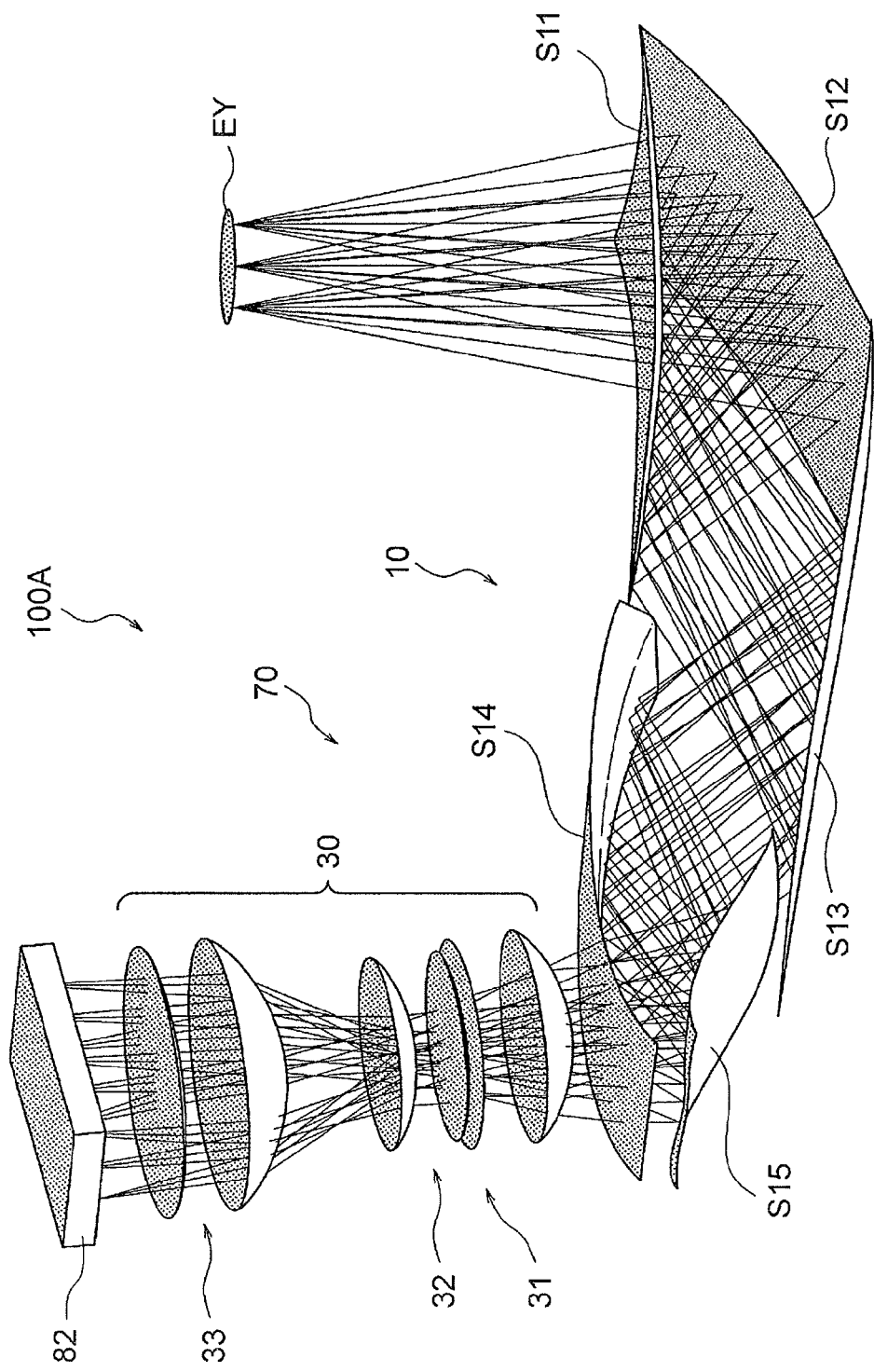
FIG. 27 is a perspective view showing each surface of an optical system for an example of a virtual image display apparatus according to one embodiment.

FIG. 27 is a perspective view showing respective surfaces of an optical system in regard to an example (corresponding to Example 1) of a virtual image display apparatus. As shown in the drawing, in the light guide member 10 of the virtual image display apparatus 100, it is understood that respective surfaces S11 to S15 having an optical function or lens surfaces constituting the projection lens 30 are curved surfaces which have curvature in the X and Y directions, and in particular, many of the surfaces constituting the light guide member 10 are free-form surfaces different in curvature between the X direction and the Y direction. This shape is provided, making it possible to perform optical path adjustment of desired video light or aberration correction. Though not shown in perspective view, in the respective examples other than Example 1, similarly, many of the surfaces constituting the light guide member 10 are free-form surfaces which have curvature in the X and Y directions. However, as described above, some of these surfaces may be flat surfaces.

Others

Although the invention has been described on the basis of the foregoing embodiment, the invention is not limited to the foregoing embodiment, and may be realized in various forms without departing from the spirit of the invention. For example, the following modifications may be made.

In the above description, although the origin of a local coordinate on an opposite-sign curvature curved surface is an opposite-sign curvature point, an opposite-sign curvature curved surface on which a different point is an opposite-sign curvature point may be used.

In the above description, although the half mirror layer (transflective film) 15 is formed in a horizontal rectangular area, the contour of the half mirror layer 15 may be appropriately changed according to usages and other specifications. The transmittance or reflectance of the half mirror layer 15 may be changed according to usages and others.

In the above description, although the distribution of display luminance in the video display element 82 is not particularly adjusted, when a luminance difference occurs depending on position, or the like, the distribution of display luminance may be adjusted unevenly or the like.

In the above description, although the video display element 82 which includes a transmissive liquid crystal display or the like is used as the image display device 80, the image display device 80 is not limited to the video display element 82 which includes a transmissive liquid crystal device or the like, and various devices may be used. For example, a configuration using a reflective liquid crystal display may be made, or a digital micro-mirror device or the like may be used, instead of the video display element 82 which includes the liquid crystal display or the like. A self-luminous element represented by an LED array or an OLED (organic EL) may be used as the image display device 80.

In the foregoing embodiment, although the image display device 80 which includes a transmissive liquid crystal display or the like is used, alternatively, a scanning image display device may be used.

Figure 28:
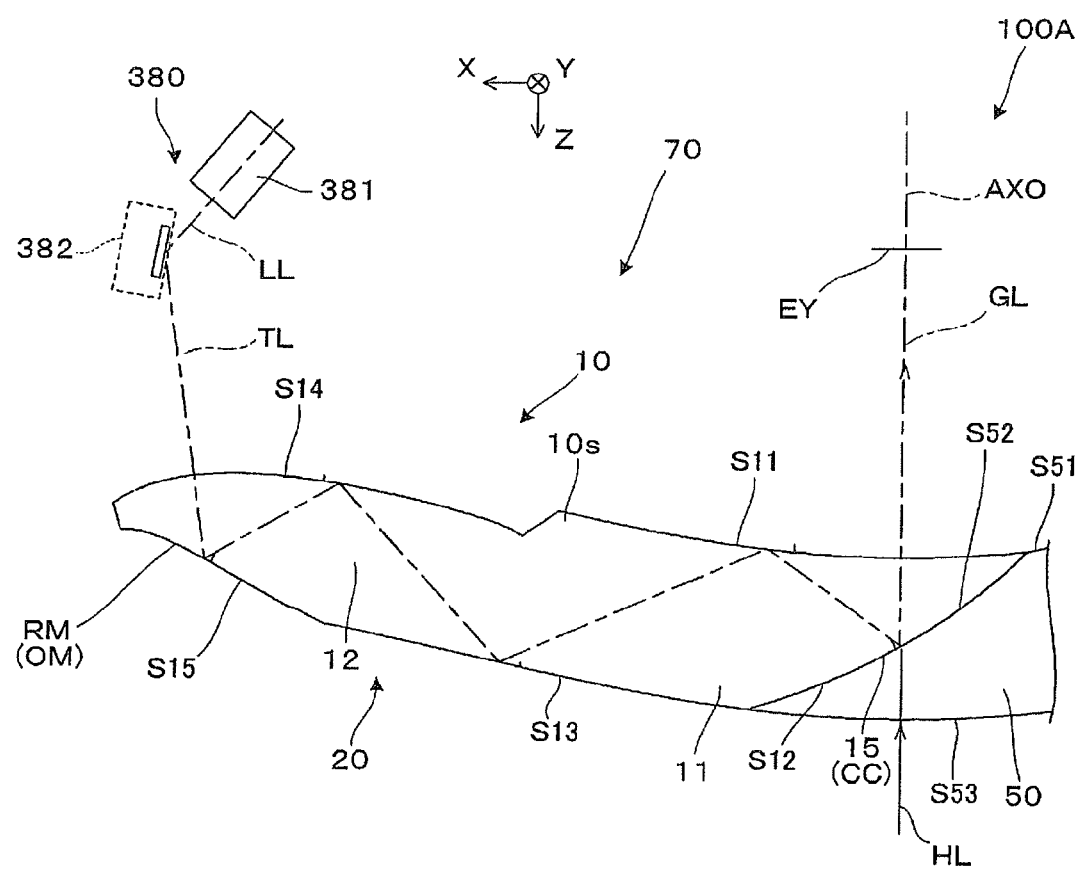
FIG. 28 is a diagram illustrating a virtual image display apparatus of a modification example according to one embodiment.

Specifically, as shown in FIG. 28, a first display device 100A which is a virtual image display apparatus includes a light guide device 20 and an image display device 380. The light guide device 20 corresponds to a first optical portion 103*a* in FIG. 1 of the foregoing embodiment, that is, corresponds to a portion where the light guide member 10 and the light transmission member 50 are bonded, thus, description thereof will be omitted. The image display device 380 is a device which forms signal light subjected to intensity modulation and emits signal light as scanning light TL, and has a signal light forming unit 381 and a scanning optical system 382.

The signal light forming unit 381 includes a light source, and emits signal light LL which is modulated and formed based on a control signal from a control circuit (not shown). The scanning optical system 382 scans and emits signal light LL passing through the signal light forming unit 381. Here, the scanning optical system 382 includes an MEMS mirror or the like, and performs two-dimensional scanning longitudinally and transversely changing the emission angle of a light beam (scanning light TL) by changing a posture in synchronization with modulation of signal light LL by the signal light forming unit 381 to adjust the optical path of signal light LL. With the above, the image display device 380 makes scanning light TL to be video light GL enter the light guide device 20, and makes scanning light TL scan the entire partial area of the second surface S12 in which the half mirror layer 15 is formed.

An operation of the first display device 100A shown in the drawing will be described. The image display device 380 emits signal light LL toward the fourth surface S14 as the light incidence surface of the light guide device 20 as scanning light TL as described above. The light guide device 20 guides scanning light TL passing through the fourth surface S14 due to total reflection or the like therein and makes scanning light TL reach the half mirror layer 15. At this time, scanning light TL is scanned on the surface of the half mirror layer 15, whereby a virtual image is formed by video light GL as a trace of scanning light TL. A person who mounts the apparatus captures the virtual image by the eye EY to visually recognize an image.

Figure 29A:
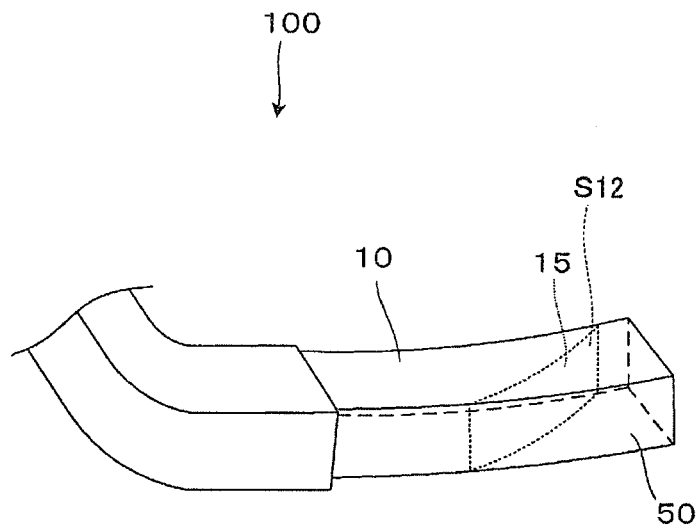
FIG. 29A is a perspective view illustrating another example of a light guide device and a virtual image display apparatus using the light guide device according to one embodiment.
Figure 29B:
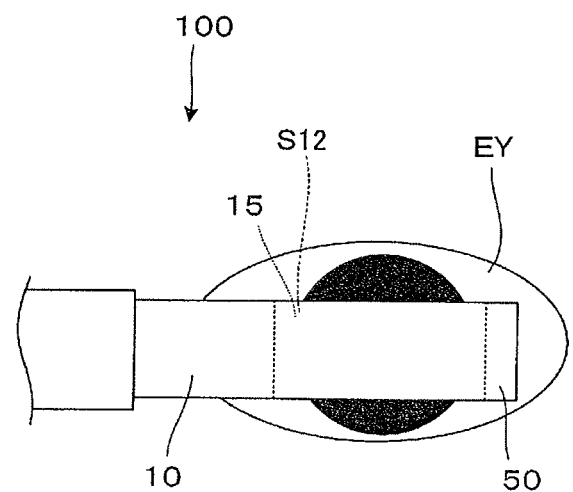
FIG. 29B is a front view thereof.

In the foregoing embodiment, although the light guide member 10 and the light transmission member 50 which is the auxiliary optical block are configured to cover the entire front of the eye EY of the observer, the invention is not limited thereto, and for example, as shown in FIGS. 29A and 29B, a small configuration may be made in which a portion including the second surface S12, which is a curved surface shape having the half mirror layer 15, covers only a part of the eye EY, that is, covers a part of the front of the eye, and an uncovered portion is provided. In this case, even with a configuration in which the light guide member 10 and the light transmission member 50 are sufficiently small and a mirror for total reflection is arranged instead of the half mirror layer 15 without using the see-through manner, a person who mounts the apparatus can observe an external scene in the vicinity of the light guide member 10 and the light transmission member 50. In the case shown in the drawing, although the half mirror layer is formed on the entire second surface S12 or the substantially entire second surface S12, the half mirror layer 15 may be formed only on a part of the second surface S12. In the example of FIG. 29B, although the half mirror layer 15 is arranged substantially in front of the eye EY, the half mirror layer 15 may be arranged to be shifted from the front, and the observer may move the eyes to visually recognize an image. For example, the position of the eye EY may be slightly lowered (the position of the light guide member 10 and the light transmission member 50 is slightly raised). In this case, the lower half of the eye EY is in a state of being viewed from the bottom of the light guide member 10 and the light transmission member 50.

In the above description, although the virtual image display apparatus 100 including a pair of display devices 100A and 100B has been described, a single display device may be provided. That is, a configuration may be made in which the projection see-through device 70 and the image display device 80 are provided only for either the right eye or the left eye to view an image with a single eye, instead of providing the set of the projection see-through device 70 and the image display device 80 for each of both the right eye and the left eye.

In the above description, although the interval between a pair of display devices 100A and 100B in the X direction has not been described, the interval between both display devices 100A and 100B is not limited to a fixed interval, and the interval may be adjusted by a mechanical mechanism or the like. That is, the interval between both display devices 100A and 100B in the X direction may be adjusted according to the eye width of the observer or the like.

In the foregoing description, although the half mirror layer 15 is a simple semitransmissive film (for example, a metal reflection film or a dielectric multilayer film), the half mirror layer 15 may be replaced with a flat or curved hologram element.

In the foregoing description, although a case where the virtual image display apparatus 100 is a head-mounted display has been specifically described, the virtual image display apparatus 100 may be modified into a head-up display.

In the above description, although video light is totally reflected by an interface with air and guided without providing a mirror, a half mirror, or the like on the first surface S11 and the third surface S13 of the light guide member 10, it is assumed that total reflection in the virtual image display apparatus 100 according to the invention includes reflection by a mirror coating or a half mirror film which is formed on the entire or a part of the first surface S11 or the third surface S13. For example, total reflection may include a case where, after the incidence angle of image light satisfies the total reflection condition, the mirror coating or the like is formed on the entire or a part of the first surface S11 or the third surface S13 to reflect substantially entire image light. Furthermore, the entire or a part of the first surface S11 or the third surface S13 may be coated with a mirror having a slight transmission property insofar as sufficiently bright image light can be obtained.

In the above description, although the light guide member 10 or the like extends in the horizontal direction in which the eyes EY are arranged, the light guide member 10 may be arranged to extend in the vertical direction. In this case, the light guide member 10 has a structure of being arranged in parallel, not in series. The configurations relating to the vertical direction and the horizontal direction may be appropriately replaced according to the direction in which video light (image light) is guided compared to the case in the above description.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A virtual image display apparatus comprising:
a light guide member which includes two or more non-axisymmetric curved surfaces and is a part of an optical system, an intermediate image being formed inside the light guide member, wherein the light guide member comprises:
a first surface; and
a third surface arranged to face the first surface; and
a video element that comprises a display screen and that generates video light that is totally reflected by the third surface, is totally reflected by the first surface, is reflected by a second surface, is transmitted through the first surface, and reaches an observation side,
wherein:
for a total light beam flux which is emitted from the entire display screen of the video element and is within an effective range to reach a pupil arrangement position to be the position of a pupil of an eye of an observer,
when, in a light beam flux cross-section of a region representing the range of the entire display screen of the video element, a surface position of the cross-section where a length in a first direction corresponding to a full width in a longitudinal direction becomes minimum is an A surface position located between a surface of the video element and a surface of the light guide member,
when, in a light beam flux cross-section of a region representing the range of the entire display screen of the video element, a surface position of the cross-section where a length in a second direction corresponding to a full width in a lateral direction is a B surface position located between the surface of the video element and the surface of the light guide member,
when, in the light beam flux cross-section at the A surface position, the width in the first direction is WAx and the width in the second direction is WAy,
when, in the light beam flux cross-section at the B surface position, the width in the first direction is WBx and the width in the second direction is WBy, and
the conditional expressions (1) and (2) are established:

$$WAx < WAy \tag{1}$$

$$WBy < WBx \tag{2}$$

2. The virtual image display apparatus according to claim 1,
wherein an x axis and a y axis are taken in two orthogonal directions at one point on a curved surface of the light guide member, and when the curvature in the x-axis direction is Kx and the curvature in the y-axis direction is Ky, at least one curved surface has a point which satisfies the following conditional expression (3):

$$0.005 < |Kx - Ky| \tag{3}$$

3. The virtual image display apparatus according to claim 1,
wherein, when a reference value which is a length to be the diameter of the pupil of the observer is H,
in regard to the width WAx and the width WAy of the light beam flux cross-section at the A surface position and the width WBx and the width WBy of the light beam flux cross-section at the B surface position, the following conditional expressions (4) and (5) are established:

$$WAx < H < WAy \tag{4}$$

$$WBy < H < WBx \tag{5}$$

4. The virtual image display apparatus according to claim 1,
wherein the light guide member causes video light and external light to be visually recognized, and
when an external scene is visually recognized through the first surface and the third surface, diopter is substantially 0.

5. The virtual image display apparatus according to claim 1,
wherein, when an expression of a surface shape is expanded as a polynomial in terms of orthogonal coordinates x and y extending in a tangential direction from the origin with the origin of each surface constituting the optical system as a reference, and the coefficient of a term $x^m \cdot y^n$ of a polynomial expression representing a k-th surface is $Ak_{m,n}$, the following conditional expressions (6) to (8) are satisfied:

$$-10^{-1} < A1_{0,2} + A1_{2,0} < 10^{-2} \text{ and } -10^{-1} < A3_{0,2} + A3_{2,0} < 10^{-2} \tag{6}$$

$$|A1_{2,0} - A1_{0,2}| < 10^{-1} \text{ and } |A3_{2,0} - A3_{0,2}| < 10^{-1} \tag{7}$$

$$|A1_{2,0} - A3_{2,0}| < 10^{-2} \text{ and } |A1_{0,2} - A3_{0,2}| < 10^{-2} \tag{8}$$

6. The virtual image display apparatus according to claim 1,
wherein a half mirror is formed on the second surface, video light is provided to an observer, a light transmission member is arranged integrally outside the second surface, diopter to external light is set to substantially 0, and external light and video light are provided to the observer in an overlapping manner.

7. The virtual image display apparatus according to claim 1, further comprising:
a projection lens which makes video light from the video element enter the light guide member,
wherein at least a part of the light guide member and the projection lens constitute a relay optical system which forms an intermediate image.

8. The virtual image display apparatus according to claim 7,
wherein the projection lens is constituted by an axisymmetric lens and includes at least one aspheric surface.

9. The virtual image display apparatus according to claim 7,
wherein the projection lens includes at least one non-axisymmetric aspheric surface.

10. The virtual image display apparatus according to claim 1,
wherein the optical system including the light guide member covers a part in front of the eyes of the observer when it is worn, and a portion where the front of the eyes is not covered is provided.

11. The virtual image display apparatus according to claim 1,
wherein the video element has a signal light forming unit which emits signal light modulated corresponding to an image, and a scanning optical system which scans signal light entering from the signal light forming unit to emit signal light as scanning light.

12. A virtual image display apparatus comprising:
a light guide member which includes two or more non-axisymmetric curved surfaces and is a part of an optical system, an intermediate image being formed inside the light guide member, wherein the light guide member comprises:
a first surface; and
a third surface arranged to face the first surface; and
a video element that comprises a display screen and that generates video light that is totally reflected by the third surface, is totally reflected by the first surface, is reflected by a second surface, is transmitted through the first surface, and reaches an observation side,
wherein:
in a light beam flux cross-section of a region representing a range of a display screen of the video element that reaches a pupil arrangement position of a pupil of an eye of an observer, a first direction relates to a longitudinal width of the light beam flux cross-section and a second direction relates to a lateral width of the light beam flux cross-section,
an A surface position of the light beam flux cross-section is when the width in the first direction is WAx and the width in the second direction is WAy, and
a B surface position of the light beam flux cross-section is when the width in the first direction is WBx and the width in the second direction is WBy, the A surface position and B surface position are both located between a surface of the video element and a surface of the light guide member,
such that the conditional expressions (1) and (2) are established:

$$WAx < WAy \tag{1}$$

$$WBy < WBx \tag{2}.$$

* * * * *